United States Patent
Sato

(10) Patent No.: US 7,689,523 B2
(45) Date of Patent: Mar. 30, 2010

(54) DESIGN SUPPORT METHOD AND DESIGN SUPPORT SYSTEM

(75) Inventor: Hiroshi Sato, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 997 days.

(21) Appl. No.: 11/409,072

(22) Filed: Apr. 24, 2006

(65) Prior Publication Data

US 2007/0005307 A1  Jan. 4, 2007

(30) Foreign Application Priority Data

Apr. 25, 2005 (JP) .............................. 2005-126529

(51) Int. Cl.
G06F 17/00 (2006.01)
G06N 5/00 (2006.01)
G06N 5/02 (2006.01)

(52) U.S. Cl. .......................................... 706/45; 706/46
(58) Field of Classification Search ..................... 706/45
See application file for complete search history.

(56) References Cited

U.S. PATENT DOCUMENTS

| | | | |
|---|---|---|---|
| 5,630,025 A | 5/1997 | Dolby et al. | |
| 6,108,586 A | 8/2000 | Suzuki et al. | |
| 7,270,970 B2 * | 9/2007 | Anderson et al. | 435/7.94 |
| 7,271,765 B2 * | 9/2007 | Stilp et al. | 342/457 |
| 7,313,447 B2 * | 12/2007 | Hsiung et al. | 700/9 |
| 7,319,877 B2 * | 1/2008 | Krumm et al. | 455/456.3 |
| 7,331,542 B2 * | 2/2008 | Cocciadiferro et al. | 242/597 |
| 7,340,111 B2 * | 3/2008 | Ishitani et al. | 382/299 |
| 7,341,632 B2 * | 3/2008 | Noble | 118/317 |
| 7,386,969 B2 * | 6/2008 | Hayduk | 53/459 |
| 7,391,565 B2 * | 6/2008 | Lauer | 359/368 |
| 7,395,968 B2 * | 7/2008 | Dickson et al. | 235/462.01 |
| 7,433,742 B2 * | 10/2008 | Weiss | 700/28 |
| 7,490,737 B2 * | 2/2009 | Cocciadiferro et al. | 222/145.5 |
| 7,599,897 B2 * | 10/2009 | Hartman et al. | 706/15 |
| 2004/0103380 A1 | 5/2004 | Bohl et al. | |
| 2005/0138486 A1 | 6/2005 | Gromyko | |

FOREIGN PATENT DOCUMENTS

EP     0 561 564 A2    9/1993

(Continued)

OTHER PUBLICATIONS

Integrated Modeling of C4 Interconnects Sylvestre, J.; Electronic Components and Technology Conference, 2007. ECTC '07. Proceedings. 57th May 29, 2007-Jun. 1, 2007 pp. 1084-1090 Digital Object Identifier 10.1109/ECTC.2007.373932.*

(Continued)

Primary Examiner—Michael B Holmes
(74) Attorney, Agent, or Firm—Mattingly & Malur, P.C.

(57) ABSTRACT

In a system according to the present invention, when there occurs a failure or problem phenomenon in a new case example of designing, assembling components (parts, assembling operations and attributes thereof) are input. Failure influence indices are calculated for the assembling components respectively based on assembling operation/attribute coefficients. Assembling components to be improved are extracted, and specific solutions built for the assembling components respectively are displayed on a display so that a specific solution can be selected therefrom. Specific risks expected for the selected solutions respectively are built. The specific solutions and the specific risks are displayed on the display so as to be associated with each other.

12 Claims, 15 Drawing Sheets

FOREIGN PATENT DOCUMENTS

| | | |
|---|---|---|
| EP | 0 985 992 B1 | 3/2000 |
| JP | 10-334151 | 12/1998 |
| JP | 2006-018541 | 1/2006 |
| JP | 2006-018544 | 1/2006 |
| JP | 2006-031212 | 2/2006 |

OTHER PUBLICATIONS

Localization Method Using Vector-Histogram Myoung-Ho Kim; Min Kim; Kwae-Hi Lee; Smart Manufacturing Application, 2008. ICSMA 2008. International Conference on Apr. 9-11, 2008 pp. 581-584 Digital Object Identifier 10.1109/ICSMA.2008.4505592.*

Conventional Methods and AI models for Solving an Industrial an Industrial Problem Bustillo, A.; Sedano, J.; Villar, J.R.; Curiel, L.; Corchado, E.; Computer Modeling and Simulation, 2008. EMS '08. Second UKSIM European Symposium on Sept. 8-10, 2008 pp. 317-322 Digital Object Identifier 10.1109/EMS.2008.106.*

Kepner, et al. "Rational Manager", McGrawHill, 1965.

Blosiu, "Use of synetics as an idea seeding technique to enhance design creativity" Systems, Man, and Cybernetics, IEEE SMC '99 Conference Proceedings. 1999 IEEE International Conference on Tokyo, Japan, Oct. 12-15, 1999, Piscataway, NJ, USA, IEEE, US, vol. 3, Oct. 12, 1999, pp. 1001-1006, XP010363748.

Ziv-Av et al., "SOS-subjective objective system for generating optimal product concepts" Design Studies, Design Research Society, XX, vol. 26, No. 5, Sep. 2005, pp. 509-533, XP004989094.

* cited by examiner

FIG. 4

| No | PARTS | | ASSEMBLING OPERATIONS | | ATTRIBUTES | |
|---|---|---|---|---|---|---|
| | TITLE | NUMBER | TITLE | REPETITION NUMBER | TITLE | REPETITION NUMBER |
| 1 | HOUSING | 1 | DOWNWARD MOVE | 1 | | |
| 2 | CHANGEOVER LEVER | 1 | DOWNWARD MOVE | 1 | DESIGNED SURFACE PRESENT | 1 |
| 3 | | | SHAPE | 2 | | |
| 4 | | | ROTATE | 1 | DESIGNED SURFACE PRESENT | 1 |
| 5 | | | | | COUPLING PORTION DIFFICULT TO OBSERVE | 1 |
| 6 | | | PRESS-IN | 1 | THREE FITTED SIMULTANEOUSLY | 1 |

FIG. 5A

| TERM | PROBLEM | ASSEMBLING COMPONENT (OPERATION) | SOLUTION |
|---|---|---|---|
| GENERALIZATION | | ROTATE | |
| REAL DATA | TO ROTATE VENTILATING FAN MOTOR AND PUT IT ON POSITIONING BRACKET | ROTATE | TO WIDEN (NARROW) FITTING PORTION FOREFRONT END AND ATTACH IT IN LINEAR MOTION |
| | | ROTATE | TO WIDEN FOREFRONT END OF VENTILATING FAN MOTOR POSITIONING BRACKET AND ATTACH IT IN LINEAR MOTION |
| | TO ROTATE VTR GUIDE PIN AND PRESS IT INTO POSITIONING HOLE | ROTATE | TO NARROW FITTING PORTION FOREFRONT END OF VTR GUIDE PIN AND ATTACH IT IN LINEAR MOTION |
| | TO ROTATE ELECTRIC MACHINE CHANGEOVER LEVER AND ATTACH IT TO HOUSING | ROTATE | TO ELONGATE FITTING NAIL FOREFRONT END OF ELECTRIC MACHINE CHANGEOVER LEVER AND ATTACH IT IN LINEAR MOTION |

FIG. 5B

| TERM | PROBLEM | ASSEMBLING COMPONENT (ATTRIBUTE) | SOLUTION |
|---|---|---|---|
| GENERALIZATION | | COUPLING PORTION DIFFICULT TO OBSERVE | |
| REAL DATA | VENTILATING FAN MOTOR MOUNTING BRACKET FIXING TAPPING LOWER-HOLE DIFFICULT TO OBSERVE | COUPLING PORTION DIFFICULT TO OBSERVE | TO RELOCATE COUPLING PORTION IN VISIBLE REGION |
| | | COUPLING PORTION DIFFICULT TO OBSERVE | TO RELOCATE COUPLING PORTION OF VENTILATING FAN MOTOR MOUNTING BRACKET FIXING SCREW IN VISIBLE REGION |
| | FITTING PORTION OF NAIL FOR PREVENTING VTR LOADING ARM FROM BEING DETACHED, DIFFICULT TO OBSERVE | COUPLING PORTION DIFFICULT TO OBSERVE | TO RELOCATE COUPLING PORTION OF VTR LOADING ARM IN VISIBLE REGION |
| | COUPLING PORTION OF FITTING NAIL OF ELECTRIC MACHINE CHANGEOVER LEVER WITH HOUSING, DIFFICULT TO OBSERVE | COUPLING PORTION DIFFICULT TO OBSERVE | TO RELOCATE COUPLING PORTION OF FITTING NAIL OF ELECTRIC MACHINE CHANGEOVER LEVER WITH HOUSING IN VISIBLE REGION |

FIG. 6

| CATEGORY | ASSEMBLING COMPONENT | SOLUTION |
|---|---|---|
| PART | ASSEMBLING PART | TO DIVIDE TO-BE-ATTACHED PART AND CHANGE ORDER OF ASSEMBLING |
| | | TO INTEGRATE TO-BE-ATTACHED PART WITH ANOTHER PART |
| OPERATION | SHAPE | TO INSTALL SHAPE STABILIZING REINFORCEMENT |
| | ROTATE | TO WIDEN (NARROW) FITTING PORTION FOREFRONT END AND ATTACH IT IN LINEAR MOTION |
| | | TO ATTACH IT BY SCREWING OPERATION |
| ATTRIBUTE | DESIGNED SURFACE PRESENT | TO INCREASE RELATIVE STRENGTH OF DESIGNED SURFACE |
| | | TO CHANGE MOVING ROUTE OF DESIGNED SURFACE |
| | COUPLING PORTION DIFFICULT TO OBSERVE | TO RELOCATE COUPLING PORTION IN VISIBLE REGION |
| | | TO RELOCATE PART COMPONENT OBSTRUCTIVE TO COUPLING PORTION |

FIG. 7

| SOLUTION | RISK |
|---|---|
| TO DIVIDE TO-BE-ATTACHED PART AND CHANGE ORDER OF ASSEMBLING | CAN TO-BE-ATTACHED PART BE DIVIDED ? |
| TO INTEGRATE WITH ANOTHER PART | CAN IT BE INTEGRATED WITH ANOTHER PART ? |
| TO INSTALL SHAPE STABILIZING REINFORCEMENT | CAN SHAPE STABILIZING REINFORCEMENT BE INSTALLED ? |
| TO WIDEN (NARROW) FITTING PORTION FOREFRONT END AND ATTACH IT IN LINEAR MOTION | CAN FITTING PORTION FOREFRONT END BE SHAPED ? |
| TO ATTACH IT BY SCREWING OPERATION | CAN IT BE ATTACHED BY SCREWING OPERATION |
| TO INCREASE RELATIVE STRENGTH OF DESIGNED SURFACE | CAN INCREASE OF MATERIAL COST BE SUPPRESSED ? |
| TO CHANGE MOVING ROUTE OF DESIGNED SURFACE | CAN MOVING ROUTE OF DESIGNED SURFACE BE CHANGED ? |
| TO RELOCATE COUPLING PORTION IN VISIBLE REGION | CAN COUPLING PORTION BE RELOCATED IN VISIBLE REGION ? |
| TO RELOCATE PART COMPONENT OBSTRUCTIVE TO COUPLING PORTION | CAN PART COMPONENT OBSTRUCTIVE TO COUPLING PORTION BE RELOCATED ? |

FIG. 9

| No | PART | | ASSEMBLING OPERATION | | ATTRIBUTE | | ASSEMBLING FAILURE INFLUENCE INDEX | WHETHER TO BE IMPROVED OR NOT |
|---|---|---|---|---|---|---|---|---|
| | TITLE | n | TITLE | n | TITLE | n | | |
| 1 | HOUSING | 1 | — | | — | | 1 | |
| 2 | CHANGEOVER LEVER | 1 | — | | — | | 99 | ◎ |
| 3 | (HOUSING) | 1 | DOWNWARD MOVE | 1 | — | | 1 | |
| 4 | (CHANGEOVER LEVER) | 1 | DOWNWARD MOVE | 1 | — | | 3 | |
| 5 | (CHANGEOVER LEVER) | 1 | SHAPE | 2 | — | | 24 | ◎ |
| 6 | (CHANGEOVER LEVER) | 1 | ROTATE | 1 | — | | 57 | |
| 7 | (CHANGEOVER LEVER) | 1 | PRESS-IN | 1 | — | | 14 | |
| 8 | (CHANGEOVER LEVER) | 1 | (DOWNWARD MOVE) | 1 | DESIGNED SURFACE PRESENT | 1 | 1 | |
| 9 | (CHANGEOVER LEVER) | 1 | (ROTATE) | 1 | DESIGNED SURFACE PRESENT | 1 | 29 | |
| 10 | (CHANGEOVER LEVER) | 1 | (ROTATE) | 1 | COUPLING PORTION DIFFICULT TO OBSERVE | 1 | 46 | ◎ |
| 11 | (CHANGEOVER LEVER) | 1 | (PRESS-IN) | 1 | THREE FITTED SIMULTANEOUSLY | 1 | 4 | |

FIG. 10

| | PART | 1 CHANGEOVER LEVER | | RESULT | 2 (CHANGEOVER LEVER) | | RESULT | 3 (CHANGEOVER LEVER) | | RESULT |
|---|---|---|---|---|---|---|---|---|---|---|
| | OPERATION | — | | | ROTATE | | | (ROTATE) | | |
| | ATTRIBUTE | — | | | — | | | COUPLING PORTION DIFFICULT TO OBSERVE | | |
| | INDEX | 99 | | | 57 | | | 46 | | |
| | | SOLUTION (COMPONENT 1) | | | SOLUTION (COMPONENT 2) | | | SOLUTION (COMPONENT 3) | | |
| SPECIFIC SOLUTION | 1 | TO DIVIDE TO-BE-ATTACHED PART AND CHANGE ORDER OF ASSEMBLING IN ORDER TO REDUCE FAILURE IN ASSEMBLING OF CHANGEOVER LEVER | | ◎ | TO WIDEN (NARROW) FITTING PORTION FOREFRONT END AND ATTACH IT IN LINEAR MOTION IN ORDER TO IMPROVE ROTATION OPERATION OF CHANGEOVER LEVER | | | TO RELOCATE COUPLING PORTION IN VISIBLE REGION IN ORDER TO IMPROVE COUPLING PORTION DIFFICULT TO OBSERVE DURING ROTATION OPERATION OF CHANGEOVER LEVER | | ◎ |
| | 2 | TO INTEGRATE WITH ANOTHER PART IN ORDER TO REDUCE FAILURE IN ASSEMBLING OF CHANGEOVER LEVER | | | TO ATTACH IT BY SCREWING OPERATION IN ORDER TO IMPROVE ROTATION OPERATION OF CHANGEOVER LEVER | | ◎ | TO RELOCATE PART COMPONENT OBSTRUCTIVE TO COUPLING PORTION IN ORDER TO IMPROVE COUPLING PORTION DIFFICULT TO OBSERVE DURING ROTATION OPERATION OF CHANGEOVER LEVER | | |
| ASSEMBLING COMPONENT TO BE IMPROVED | | | | | | | | | | |

FIG. 11

| No | SPECIFIC SOLUTION | INDEX | SPECIFIC RISK |
|---|---|---|---|
| 1 | TO DIVIDE TO-BE-ATTACHED PART AND CHANGE ORDER OF ASSEMBLING IN ORDER TO REDUCE FAILURE IN ASSEMBLING OF CHANGEOVER LEVER | 99 | CAN TO-BE-ATTACHED PART BE DIVIDED WHEN "TO DIVIDE TO-BE-ATTACHED PART AND CHANGE ORDER OF ASSEMBLING IN ORDER TO IMPROVE FAILURE IN ASSEMBLING OF CHANGEOVER LEVER" IS CARRIED OUT ? |
| 2 | TO WIDEN (NARROW) FITTING PORTION FOREFRONT END AND ATTACH IT IN LINEAR MOTION IN ORDER TO IMPROVE ROTATION OPERATION OF CHANGEOVER LEVER | 57 | CAN FITTING PORTION FOREFRONT END BE SHAPED WHEN "TO WIDEN (NARROW) FITTING PORTION FOREFRONT END AND ATTACH IT IN LINEAR MOTION IN ORDER TO IMPROVE ROTATION OPERATION OF CHANGEOVER LEVER" IS CARRIED OUT ? |
| 3 | TO RELOCATE COUPLING PORTION IN VISIBLE REGION IN ORDER TO IMPROVE COUPLING PORTION DIFFICULT TO OBSERVE DURING ROTATION OPERATION OF CHANGEOVER LEVER | 46 | CAN COUPLING PORTION BE RELOCATED IN VISIBLE REGION WHEN "TO RELOCATE COUPLING PORTION IN VISIBLE REGION IN ORDER TO IMPROVE COUPLING PORTION DIFFICULT TO OBSERVE DURING ROTATION OPERATION OF CHANGEOVER LEVER" IS CARRIED OUT ? |

FIG. 12

| No | SPECIFIC SOLUTION/ASSEMBLING FAILURE INFLUENCE INDEX | SOLUTION 1: TO DIVIDE TO-BE-ATTACHED PART AND CHANGE ORDER OF ASSEMBLING IN ORDER TO REDUCE FAILURE IN ASSEMBLING OF CHANGEOVER LEVER | INDEX: 99 | SOLUTION 2: TO WIDEN (NARROW) FITTING PORTION FOREFRONT END AND ATTACH IT IN LINEAR MOTION IN ORDER TO IMPROVE ROTATION OPERATION OF CHANGEOVER LEVER | INDEX: 57 | SOLUTION 3: TO RELOCATE COUPLING PORTION IN VISIBLE REGION IN ORDER TO IMPROVE COUPLING PORTION DIFFICULT TO OBSERVE DURING ROTATION OPERATION OF CHANGEOVER LEVER | INDEX: 46 |
|---|---|---|---|---|---|---|---|
| | SPECIFIC RISK | ASSOCIATION | | ASSOCIATION | | ASSOCIATION | |
| 1 | CAN TO-BE-ATTACHED PART BE DIVIDED WHEN "TO DIVIDE TO-BE-ATTACHED PART AND CHANGE ORDER OF ASSEMBLING IN ORDER TO IMPROVE FAILURE IN ASSEMBLING OF CHANGEOVER LEVER" IS CARRIED OUT? | ◎ | | | | | |
| 2 | CAN FITTING PORTION FOREFRONT END BE SHAPED WHEN "TO WIDEN (NARROW) FITTING PORTION FOREFRONT END AND ATTACH IT IN LINEAR MOTION IN ORDER TO IMPROVE ROTATION OPERATION OF CHANGEOVER LEVER" IS CARRIED OUT? | | | ◎ | | | |
| 3 | CAN COUPLING PORTION BE RELOCATED IN VISIBLE REGION WHEN "TO RELOCATE COUPLING PORTION IN VISIBLE REGION IN ORDER TO IMPROVE COUPLING PORTION DIFFICULT TO OBSERVE DURING ROTATION OPERATION OF CHANGEOVER LEVER" IS CARRIED OUT? | | | | | ◎ | |

FIG. 17

| No | SPECIFIC RISK | SOLUTION 1: TO DIVIDE TO-BE-ATTACHED PART AND CHANGE ORDER OF ASSEMBLING IN ORDER TO REDUCE FAILURE IN ASSEMBLING OF CHANGEOVER LEVER | INDEX 99 | SOLUTION 2: TO WIDEN (NARROW) FITTING PORTION FOREFRONT END AND ATTACH IT IN LINEAR MOTION IN ORDER TO IMPROVE ROTATION OPERATION OF CHANGEOVER LEVER | INDEX 57 | SOLUTION 3: TO RELOCATE COUPLING PORTION IN VISIBLE REGION IN ORDER TO IMPROVE COUPLING PORTION DIFFICULT TO OBSERVE DURING ROTATION OPERATION OF CHANGEOVER LEVER | INDEX 46 |
|---|---|---|---|---|---|---|---|
| | SPECIFIC SOLUTION/ASSEMBLING FAILURE INFLUENCE INDEX | ASSOCIATION | EVALUATION | ASSOCIATION | EVALUATION | ASSOCIATION | EVALUATION |
| 1 | CAN TO-BE-ATTACHED PART BE DIVIDED WHEN "TO DIVIDE TO-BE-ATTACHED PART AND CHANGE ORDER OF ASSEMBLING IN ORDER TO IMPROVE FAILURE IN ASSEMBLING OF CHANGEOVER LEVER" IS CARRIED OUT? | ◎ | 80 | | | | |
| 2 | CAN FITTING PORTION FOREFRONT END BE SHAPED WHEN "TO WIDEN (NARROW) FITTING PORTION FOREFRONT END AND ATTACH IT IN LINEAR MOTION IN ORDER TO IMPROVE ROTATION OPERATION OF CHANGEOVER LEVER" IS CARRIED OUT? | | | ◎ | 30 | | |
| 3 | CAN COUPLING PORTION BE RELOCATED IN VISIBLE REGION WHEN "TO RELOCATE COUPLING PORTION IN VISIBLE REGION IN ORDER TO IMPROVE COUPLING PORTION DIFFICULT TO OBSERVE DURING ROTATION OPERATION OF CHANGEOVER LEVER" IS CARRIED OUT? | | | | | ◎ | 10 |
| | RISK INDEX | | 100 | | 38 | | 13 |

| RESTRAINING CONDITION | | No | CONDITION | INFORMATION | EVALUATION | INFORMATION | EVALUATION | INFORMATION | EVALUATION |
|---|---|---|---|---|---|---|---|---|---|
| NECESSARY | | 1 | IMPROVEMENT EXPENSE (NOT HIGHER THAN 30M YEN) | 50M¥ | × | 25M¥ | ○ | 25M¥ | ○ |
| | | 2 | TIME FOR COMPLETION ('04.12.30) | '04.12.12 | ○ | '04.12.24 | ○ | '04.12.30 | ○ |
| DESIRED | | 1 | TO USE CONVENTIONAL TECHNIQUES IF POSSIBLE | MOLD NEWLY DEVELOPED | 80 | MOLD NEWLY DEVELOPED | 32 | MOLD NEWLY DEVELOPED | 64 |
| | | 2 | ABLE TO BE DEVELOPED TO SIMILAR GOODS | NO DEVELOPED TECHNIQUE | 0 | ABLE TO BE DEVELOPED | 30 | ABLE TO BE DEVELOPED | 30 |
| RESTRAINING CONDITION INDEX | | | | NECESSARY CONDITION UNSATISFIED | × | GOOD SOLUTION | 56 | | 100 |
| TOTAL EVALUATION/TOTAL INDEX | | | | | × | | 55 | OPTIMUM SOLUTION | 100 |

DESIGN SUPPORT METHOD AND DESIGN SUPPORT SYSTEM

INCORPORATION BY REFERENCE

This application claims priority of Japanese Patent Application No. 2005-126529 filed on Apr. 25, 2005, the contents of which are incorporated herein by reference.

BACKGROUND OF THE INVENTION

The present invention relates to a method and a system for supporting designing of home electric appliances, office automation equipment, etc.

When a product is designed, potential for failure in assembling constituent parts of the product is quantified and estimated. To that end, there has been hitherto proposed a method in which the operation to assemble the product is analyzed, and the potential for failure in assembling is calculated for each constituent part based on components of the operation (for example, see JP-A-10-334151).

As a method for sending a solution to a problem, TRIZ or the like has been proposed. There has been developed TRIZ software for outputting cases of solutions to a problem in response to an input of features of the problem.

Further, as a method for extracting a risk from a solution, there has been proposed a Reviewed Dendrogram or the like. This is a technique to give shape to a risk through a chain of questions and answers in such a manner that a question about a solution is asked, answers are prepared for the question, and a question about a selected answer is asked.

Further, as a method for deciding an optimum solution, there has been proposed a method in which an optimum solution is decided based on risk and restraining condition (for example, see C. H. Kepner "Shin-Kanrisya no Handanryoku" Sangyo Nouritsu Daigaku Shuppanbu).

However, the technique for extracting parts having high potential for failure in assembling, the technique for extracting a solution to a problem, the technique for extracting a risk from a solution, the technique for deciding an optimum solution from a solution and a risk, etc. are technique independent of one another. It is therefore impossible to use results of the techniques together as a database to solve a problem.

SUMMARY OF THE INVENTION

In order to solve the aforementioned problem, an object of the present invention is to provide a method and a system for supporting designing, in which an optimum solution to reduce failure in assembling products can be decided.

In order to attain the foregoing object, the present invention provides a design support method for extracting solutions for solving a failure or problem phenomenon when the failure or problem phenomenon occurs in a new case example of designing, including: a storing step of storing assembling operation/attribute coefficients as a database in advance, the assembling operation/attribute coefficients indicating potentials for failure in assembling of assembling operations and attributes respectively, the assembling operation/attribute coefficients being decided based on a large number of past case examples of designing where there occurred failure or problem phenomena; a computing step of calculating failure influence indices based on the assembling operation/attribute coefficients read from the database when there occurs a failure or problem phenomenon in a new case example of designing, the failure influence indices indicating influences of parts in the new case example of designing, assembling operations of each part, and attributes involved in each assembling operation on a failure in assembling; and an extraction/presentation step of displaying and presenting the failure influence indices on a screen so that ones of the parts, the assembling operations and the attributes can be extracted based on the failure influence indices, the failure influence indices having been calculated for the parts, the assembling operations and the attributes respectively in the new case example of designing.

The invention also provides a design support method for extracting solutions for solving a failure or problem phenomenon when the failure or problem phenomenon occurs in a new case example of designing, including: a storing step of storing assembling operation/attribute coefficients and data as a database in advance, the assembling operation/attribute coefficients indicating potentials for failure in assembling of assembling operations and attributes respectively, the assembling operation/attribute coefficients being decided based on a large number of past case examples of designing where there occurred failure or problem phenomena, the data including assembling operations, attributes and solutions for the assembling operations and attributes, the assembling operations, the attributes and the solutions being collected, associated with one another, hierarchized and developed; an input step of inputting parts in a new case example of designing, assembling operations of the parts, and attributes involved in the assembling operations when there occurs a failure or problem phenomenon in the new case example of designing; a computing step of calculating failure influence indices based on the assembling operation/attribute coefficients read from the database, the failure influence indices indicating influences of the input parts of the new case example of designing, the input assembling operations of each part, and the input attributes involved in each assembling operation on a failure in assembling; a selection step of selecting ones high in the calculated failure influence indices from the input parts of the new case example of designing, the input assembling operations and the input attributes; an extraction step of extracting solutions associated with the selected parts, assembling operations or attributes from the database; a building step of building specific solutions from the extracted solutions and the parts, assembling operations or attributes associated with the solutions; and a presentation step of displaying and presenting at least the built specific solutions on a screen.

The invention also provides a design support method for extracting solutions for solving a failure or problem phenomenon when the failure or problem phenomenon occurs in a new case example of designing, including: a storing step of storing assembling operation/attribute coefficients and data as a database in advance, the assembling operation/attribute coefficients indicating potentials for failure in assembling of assembling operations and attributes respectively, the assembling operation/attribute coefficients being decided based on a large number of past case examples of designing where there occurred failure or problem phenomena, the data including assembling operations, attributes, solutions for the assembling operations and attributes, and risks against the solutions, the assembling operations, the attributes, the solutions and the risks being collected, associated with one another, hierarchized and developed; an input step of inputting parts in a new case example of designing, assembling operations of the parts, and attributes involved in the assembling operations when there occurs a failure or problem phenomenon in the new case example of designing; a computing step of calculating failure influence indices based on the assembling operation/attribute coefficients read from the database, the failure influence indices indicating influences of the input parts of the new case example of designing, the input assembling operations of each part, and the input attributes involved in each assembling operation on a failure in assembling; a selection step of selecting ones high in the calculated failure influence indices from the input parts of the new case example of designing, the input assembling operations and the input attributes; an extraction step of extracting solutions associated with the selected parts, assembling operations or attributes, and risks associated with the solutions from the database; a solution building step of building specific solutions from the extracted solutions and the parts, assembling operations or attributes associated with the solutions; a risk building step of building specific risks from the extracted risks and the parts, assembling operations or attributes associated with the risks; and a presentation step of displaying and presenting at least the built specific solutions and the built specific risks on a screen.

The design support method according to the invention may further include the steps of: inputting evaluation values of the specific risks in accordance with the specific solutions; and calculating risk indices using the evaluation values; wherein the risk indices are displayed and presented on the screen together with the specific solutions and the specific risks in the presentation step.

The design support method according to the invention may further include the steps of: inputting evaluation values of restraining conditions with which the specific solutions will be carried out, in accordance with the specific solutions; and calculating restraining condition indices using the evaluation values of the restraining conditions; wherein the restraining condition indices are displayed and presented on the screen together with the specific solutions and the specific risks in the presentation step.

The design support method according to the invention may further include the steps of: inputting evaluation values of restraining conditions with which the specific solutions will be carried out, and evaluation values of the specific risks against the specific solutions, in accordance with the specific solutions; and calculating total indices or final evaluation values using the evaluation values of the restraining conditions and the evaluation values of the specific risks; wherein the total indices or the final evaluation values are displayed and presented on the screen together with the specific solutions and the specific risks in the presentation step.

In order to attain the foregoing object, the invention provides a design support system for extracting solutions for solving a failure or problem phenomenon when the failure or problem phenomenon occurs in a new case example of designing, including: a database for storing assembling operation/attribute coefficients, the assembling operation/attribute coefficients indicating potentials for failure in assembling of assembling operations and attributes respectively, the assembling operation/attribute coefficients being decided based on a large number of past case examples of designing where there occurred failure or problem phenomena; a computing means for calculating failure influence indices based on the assembling operation/attribute coefficients read from the database when there occurs a failure or problem phenomenon in a new case example of designing, the failure influence indices indicating influences of parts, assembling operations of each part, and attributes involved in each assembling operation in the new case example of designing on a failure in assembling; and a presentation means for displaying and presenting the failure influence indices on a screen, the failure influence indices having been calculated for the parts, the assembling operations and the attributes respectively in the new case example of designing.

The invention also provides a design support system for extracting solutions for solving a failure or problem phenomenon when the failure or problem phenomenon occurs in a new case example of designing, including: a database for storing assembling operation/attribute coefficients and data, the assembling operation/attribute coefficients indicating potentials for failure in assembling of assembling operations and attributes respectively, the assembling operation/attribute coefficients being decided based on a large number of past case examples of designing where there occurred failure or problem phenomena, the data including assembling operations, attributes and solutions for the assembling operations and attributes, the assembling operations, the attributes and the solutions being collected, associated with one another, hierarchized and developed; an input means for inputting parts in a new case example of designing, assembling operations of the parts, and attributes involved in the assembling operations when there occurs a failure or problem phenomenon in the new case example of designing; a computing means for calculating failure influence indices based on the assembling operation/attribute coefficients read from the database, the failure influence indices indicating influences of the input parts of the new case example of designing, the input assembling operations of each part, and the input attributes involved in each assembling operation on a failure in assembling; a selection means for selecting ones high in the calculated failure influence indices from the input parts of the new case example of designing, the input assembling operations and the input attributes; an extraction means for extracting solutions associated with the selected parts, assembling operations or attributes from the database; a building means for building specific solutions from the extracted solutions and the parts, assembling operations or attributes associated with the solutions; and a presentation means for displaying and presenting at least the built specific solutions on a screen.

The invention also provides a design support system for extracting solutions for solving a failure or problem phenomenon when the failure or problem phenomenon occurs in a new case example of designing, including: a database for storing assembling operation/attribute coefficients and data, the assembling operation/attribute coefficients indicating potentials for failure in assembling of assembling operations and attributes respectively, the assembling operation/attribute coefficients being decided based on a large number of past case examples of designing where there occurred failure or problem phenomena, the data including assembling operations, attributes, solutions for the assembling operations and attributes, and risks against the solutions, the assembling operations, the attributes, the solutions and the risks being collected, associated with one another, hierarchized and developed; an input means for inputting parts in a new case example of designing, assembling operations of the parts, and attributes involved in the assembling operations when there occurs a failure or problem phenomenon in the new case example of designing; a computing means for calculating failure influence indices based on the assembling operation/attribute coefficients read from the database, the failure influence indices indicating influences of the input parts of the new case example of designing, the input assembling operations of each part, and the input attributes involved in each assembling operation on a failure in assembling; a selection means for selecting ones high in the calculated failure influence indices from the input parts of the new case example of designing, the input assembling operations and the input attributes; an extraction means for extracting solutions associated with the selected parts, assembling operations or attributes, and risks associated with the solutions from the database; a solution building means for building specific solutions from the extracted solutions and the parts, assembling operations or attributes associated with the solutions; a risk building means for building specific risks from the extracted risks and the parts, assembling operations or attributes associated with the risks; and a presentation means for displaying and presenting at least the built specific solutions and the built specific risks on a screen.

The design support system according to the invention may further include: a means for inputting evaluation values of the specific risks in accordance with the specific solutions; and a means for calculating risk indices using the evaluation values; wherein the risk indices are displayed and presented on the screen together with the specific solutions and the specific risks by the presentation means.

The design support system according to the invention may further include: a means for inputting evaluation values of restraining conditions with which the specific solutions will be carried out, in accordance with the specific solutions; and a means for calculating restraining condition indices using the evaluation values of the restraining conditions; wherein the restraining condition indices are displayed are presented on the screen together with the specific solutions and the specific risks by the presentation means.

The design support system according to the invention may further include: a means for inputting evaluation values of restraining conditions with which the specific solutions will be carried out, and evaluation values of the specific risks against the specific solutions, in accordance with the specific solutions; and a means for calculating total indices or final evaluation values using the evaluation values of the restraining conditions and the evaluation values of the specific risks; wherein the total indices or the final evaluation values are displayed and presented on the screen together with the specific solutions and the specific risks by the presentation means.

According to the invention, assembling operation analysis data of a product to be improved are input, so that solutions for solving a failure or problem phenomenon when the product is designed or risks expected when the solutions are carried out can be acquired.

According to the invention, further, an optimum solution can be decided easily by the input and evaluation of restraining conditions.

Other objects, features and advantages of the invention will be made clear from the description of embodiments of the invention which will be made below with reference to the accompanying drawings.

BRIEF DESCRIPTION OF THE DRAWINGS

FIG. 4 is a table showing a specific example of assembling operation analysis data to be input and analyzed in Step 301 in FIG. 3;

FIG. 5A is a table for explaining generalization of solutions in Step 303 in FIG. 3;

FIG. 5B is a table for explaining generalization of solutions in Step 303 in FIG. 3;

FIG. 6 is a table showing a specific example of data of an assembling component/solution database in FIGS. 1 and 3;

FIG. 7 is a table showing a specific example of data of a solution/risk database in FIGS. 1 and 3;

FIG. 9 is a table showing a specific example of an assembling failure influence index for each assembling component calculated in Step S803 in FIG. 8;

FIG. 10 is a table showing a specific example of a specific solution list built in Step S806 in FIG. 8;

FIG. 11 is a table showing a specific example of a specific solution/risk list displayed in Step S813 in FIG. 8;

FIG. 12 is a table showing another specific example of the specific solution/risk list displayed in Step S813 in FIG. 8;

FIG. 17 is a table showing a specific example of an optimum solution extraction screen for deciding an optimum solution in the third embodiment shown in FIG. 16.

DESCRIPTION OF THE INVENTION

An optimum solution to improve a failure or a problem expected to occur when the product is assembled is decided when a product is designed. To this end, it is necessary to carry out the following steps A-D using a design support system.

(A) Extraction of Assembling Components: to extract assembling components (constituent parts, assembling operations, attributes) that are so high in potential for failure in assembling (degree of easiness of failure in assembling) that they have to be improved.

(B) Planning of Solution: to plan a solution to improve the extracted assembling components.

(C) Extraction of Risk: to extract risk when the planned solution is carried out.

(D) Decision of Optimum Solution: to decide an optimum solution in consideration of the magnitude of the risk in the planned solution and the degree of satisfaction of restraining condition.

According to the present invention, the steps are carried out to decide an optimum solution to improve a failure or a problem expected to occur when a product is assembled. Embodiments of the present invention will be described below with reference to the drawings.

Figure 1:
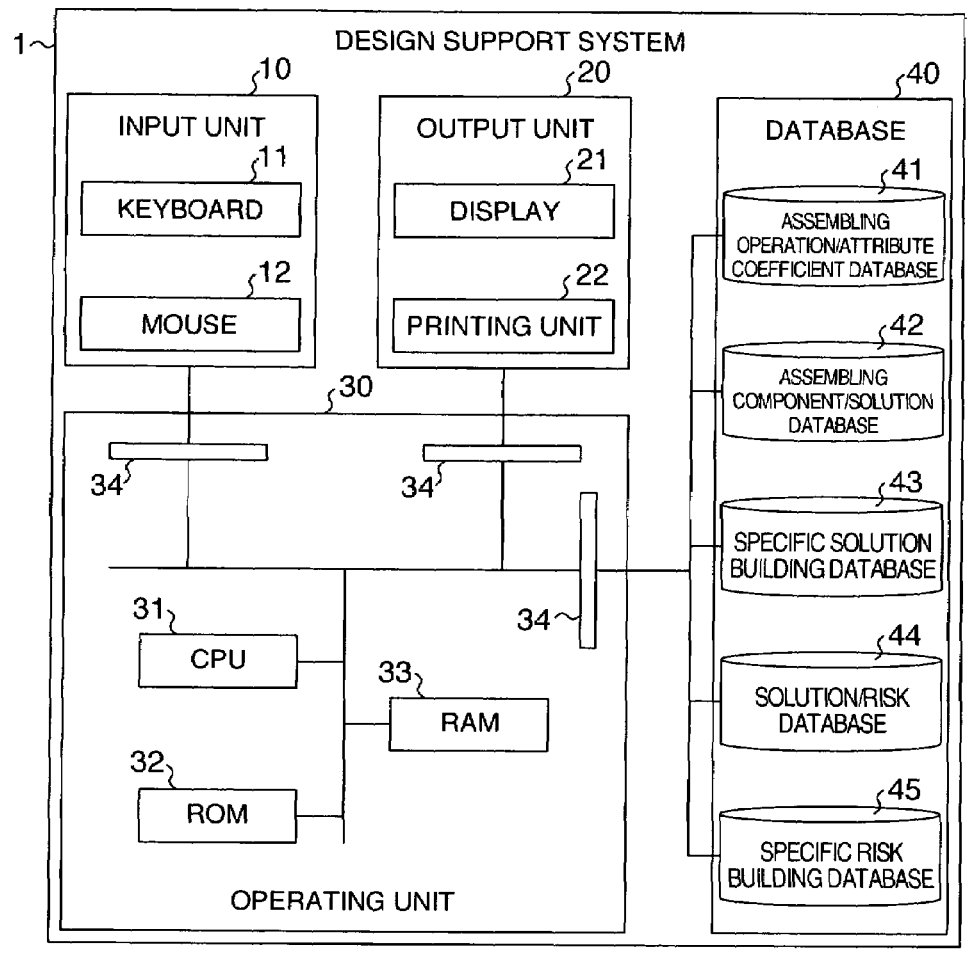
FIG. 1 is a configuration diagram showing a first embodiment of a design support system according to the invention.

FIG. 1 is a configuration diagram showing a first embodiment of a design support system according to the present invention. In FIG. 1, the reference numeral 1 represents a design support system; 10, an input unit; 11, a keyboard; 12, a mouse; 20, an output unit; 21, a display; 22, a printing unit; 30, an operating unit; 31, a CPU (Central Processing Unit); 32, a ROM (Read Only Memory); 33, a RAM (Random Access Memory); 34, an input/output portion; 40, a database portion; 41, an assembling operation/coefficient attribute database; 42, an assembling component/solution database; 43, a specific solution building database; 44, a solution/risk database; and 45, a specific risk building database.

In FIG. 1, the design support system according to this embodiment is constituted by the input unit 10, the output unit 20, the operating unit 30 and the database portion 40. The input unit 10 consists of the keyboard 11, the mouse 12, etc, and the output unit 20 consists of the display 21, the printing unit 22, etc. The operating unit 30 consists of the CPU 31, the ROM 32, the RAM 33, and the input/output portion 34 for exchanging data between the operating unit 30 and the input unit 10, the output unit 20 or the database portion 40. An extraction/presentation unit for displaying data is constituted by the operating unit 30 and the display 21. Further, the database portion 40 consists of the assembling operation/ attribute coefficient database 41, the assembling component/ solution database 42, the specific solution building database 43, the solution/risk database 44 and the specific risk building database 45.

The assembling operation/attribute coefficient database 41 stores coefficients expressing assembling failure potentials (each indicating the degree of easiness of occurrence of failure in assembling, and having a higher value as the easiness of occurrence increases) in association with assembling of parts and attributes thereof, that is, assembling operation coefficients and attribute coefficients (these coefficients will be collectively referred to as assembling operation/attribute coefficients). The assembling operation/attribute coefficients are obtained by a predetermined arithmetic process based on rates of incidence of failures or problems counted for each assembling operation and each attribute in a large number of cases of product designs where the failures or problems occurred in the past. Here, the assembling operations designate individual operations such as movement, rotation, etc. when one part is attached to another part, and the attributes designate attributes involved in the assembling operations. For example, attributes of one assembling operation include items which should be paid attention to when the assembling operation is carried out.

The assembling component/solution database 42 stores assembling component/solution data in which solutions generalized in accordance with assembling components (constituent parts, assembling operations, and attributes) are associated with each other. As for the constituent parts, solutions to failures or problems occurring in the constituent parts are classified in accordance with kinds of the constituent parts, and expressed by common expression individually. Thus, the generalized solutions for the constituent parts are obtained. As for the assembling operations, solutions to failures or problems occurring in the assembling operations are classified in accordance with kinds of the assembling operations, and expressed by common expression individually. Thus, the generalized solutions for the assembling operations are obtained. As for the attributes, solutions to failures or problems occurring in the attributes are classified, and expressed by common expression individually. Thus, the generalized solutions for the attributes are obtained. There is at least one solution generalized thus for any assembling component. The generalized solutions are obtained as follows. Real data of case examples of solutions decided really for each case example of product design are input into the design support system 1 by means of the input unit 10. The input real data are displayed on a screen of the display 21 of the output unit 20. Based on operation of an operator operating through the input unit 10, the displayed case examples of solutions are grouped and generalized into third, second and first levels by the operating unit 30, for example, through a KJ method.

The solution/risk database 44 stores the generalized solutions stored in the assembling component/solution database 42 and generalized risks while associating the solutions and the risks with each other. The generalized risks are obtained in the same manner as the generalized solutions. That is, based on the real data of the solutions used for creating the generalized solutions stored in the assembling component/solution database 42, real data of risks extracted by a designer or the like are input into the design support system 1 by means of the input unit 10. The input real data are displayed on a screen of the display 21 of the output unit 20. The displayed real data are grouped and generalized into third, second and first levels, for example, through a KJ method.

Due to the generalization of the generalized solutions or the generalized risks, it is likely that specific images cannot be imagined if the assembling component/solution data stored in the assembling component/solution database 42 or the solution/risk data stored in the solution/risk database 44 are used as they are. Thus, it may be difficult to determine whether the solutions or risks are good or not. The specific solution building database 43 or the specific risk building database 45 is provided to solve this difficulty. The specific solution building database 43 stores an algorism for clarifying what to be solved by each generalized solution and specifying the solution. The specific risk building database 45 stores an algorism for clarifying what to be caused by each generalized risk and specifying the risk.

Next, a method for creating these databases 41-45 will be described using a case example of designing shown in FIG. 2.

Figure 2:
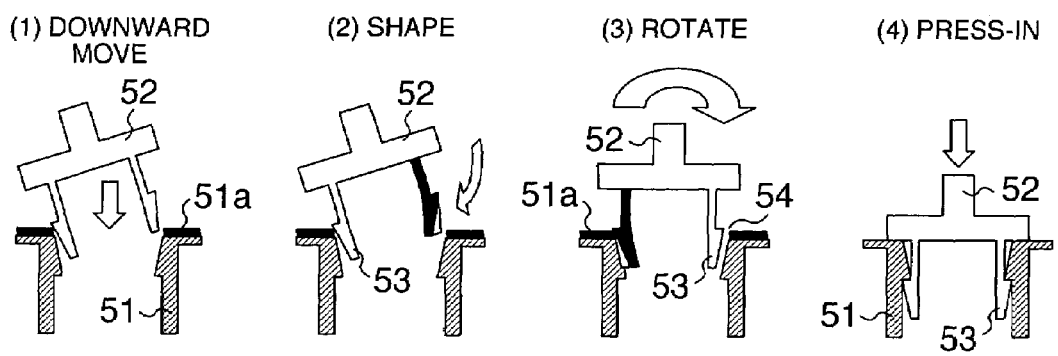
FIG. 2 is a view of an assembling work of a part of a case example of designing a product, which has been examined or will be examined for improvement.

FIG. 2 shows a part of an assembling work in a case example of designing a product, which has been examined or will be examined for improvement. The work is to attach a changeover lever 52 to a housing 51 of an electric machine. In this case, the housing 51 has been attached to a not-shown workbench by "downward move". "Constituent parts" as assembling components in this case include the housing 51 and the changeover lever 52, and the assembling components as assembling components of the changeover lever 52 have the following "assembling operations" and "attributes".

(1) The changeover lever 52 is moved downward. In this event, a surface 51a of the housing 51 is a designed surface. It is therefore necessary to be careful not to damage the designed surface. The assembling operation in this case is "downward move", and its attribute is "designed surface present".

(2) Next, nail portions 53 of the changeover lever 52 are shaped inward. Here, to "shape" is to bend by pressing. In order to push the nail portions 53 of the changeover lever 52 into the housing 51, the nail portions 53 should be bent by pressing in the arrow direction as shown by the black-painted portion. The number of the nail portions 53 is three (one of which is not shown), and two of the three are shaped. The assembling operation in this case is "shape", and there is no attribute.

(3) The changeover lever 52 is rotated to put arm portions of the nail portions 53 into the housing 51. In this case, the surface 51a of the housing 51 is a designed surface. It is therefore necessary to be careful not to damage the designed surface. In addition, it is difficult to observe an internal coupling portion 54 between the arm portion of each nail portion 53 and the housing 51. This rotation should be performed carefully. The assembling operation in this case is "rotate", and its attributes are "designed surface present" and "coupling portion difficult to observe".

(4) The changeover lever 52 is pressed into the housing 51. In this case, the arm portions of the three nail portions 53 are fitted into the housing 51 simultaneously. The assembling operation in this case is "press-in", and its attribute is "three fitted simultaneously".

Figure 3:
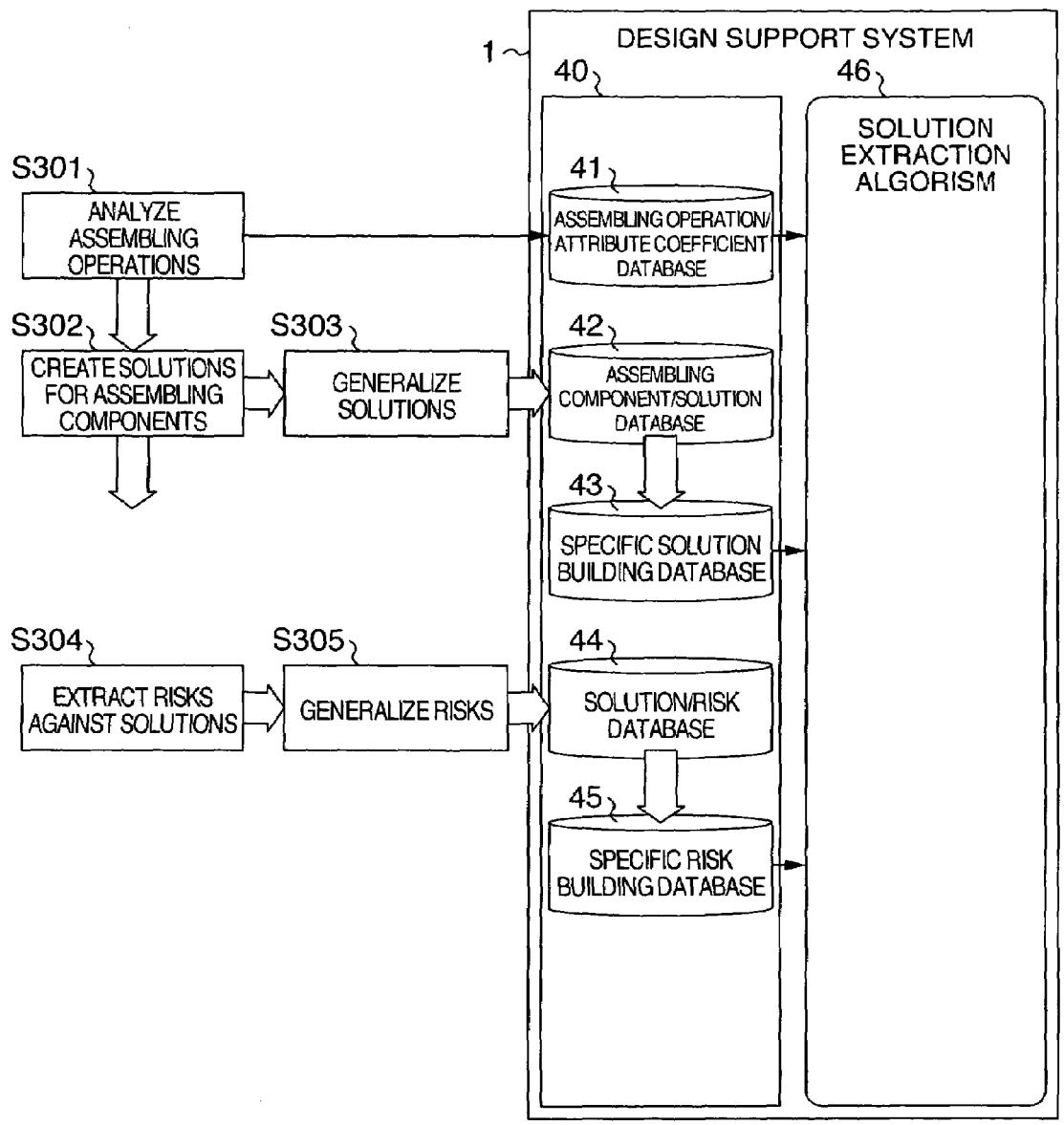
FIG. 3 is a flow chart showing a specific example of a method for creating databases in FIG. 1 using a case example of designing shown in FIG. 2 by way of example.

FIG. 3 is a flow chart showing a specific example of the method for creating each database 41-45 in FIG. 1, using the case example of designing shown in FIG. 2 by way of example.

1. Creating Assembling Operation/Attribute Coefficient Database 41 [Step S301]:

First, by use of the input portion 10 and the display 21 of the output portion 20, the assembling work shown in FIG. 2 is analyzed to create assembling operation analysis data 400 shown in FIG. 4. The assembling operation analysis data 400 consist of a title field 401 indicating the title of parts, a number field 402 indicating the number of the parts, a title field 403 indicating the tile of an assembling operation, a repetition number field 404 indicating the number of repetitions of the assembling operation, a title field 405 indicating the title of an attribute, and a repetition number field 406 indicating the number of repetitions of the attribute.

Then:

(1) Parts: The assembling work shown in FIG. 2 is a work of attaching the changeover lever 52 to the housing 51. Therefore, parts to be used are "housing" and "changeover lever", and the number of each of the parts is "1". As for the titles of the parts, "housing" and "changeover lever" are listed in the part title fields 401 of No. 1 and No. 2 respectively (input by the input unit 10. The same thing will be applied below.), and "1" is listed in the number fields 402 of each of the parts.

(2) Assembling Operation: In the assembling work shown in FIG. 2, the housing 51 is moved downward onto the workbench once as described above. Therefore, "downward move" and "1" are written in the title field 403 and the repetition number field 404 of the assembling operation of No. 1 respectively.

As for the changeover lever 52, assembling operations include downward move, shape, rotate, and press-in, as shown in FIG. 2. Therefore, "downward move", "shape", "rotate" and "press-in" are written in the title fields 403 of the assembling operations in turn from No. 2. The assembling operation "rotate" has two attributes "designed surface present" and "coupling portion difficult to observe". The fields of assembling operations are assigned to those attributes respectively. That is, two assembling operation fields are provided for the attributes. As for the number of repetitions, the assembling operation "shape" as described above is repeated twice. Therefore, "2" is written in the repetition number field 404 of the assembling operation "shape", while "1" is written in that of any other assembling operation.

(3) Attributes: In the assembling work shown in FIG. 2, the assembling operation "downward move" of the changeover lever 52 has "designed surface present", the assembling operation "rotate" has "designed surface present" and "coupling portion difficult to observe", and the assembling operation "press-in" has "three fitted simultaneously". The titles of those attributes are written in the title fields 405 corresponding to the attributes, and the numbers of repetitions of the attributes are written in the repetition number fields 406 of the attributes respectively. In this case, all the numbers of repetitions of the attributes whose titles are written in the title fields 405 of the attributes are "1".

The titles written in the title fields 403 of assembling operations or the title fields 405 of attributes are terms prepared in advance. When assembling operations or their attributes are decided from a case example of designing in the assembling work as shown in FIG. 2, the terms prepared in advance are used as their titles, and written in the corresponding title fields 403 or 405.

The assembling operation analysis data 400 are created for the case example of designing a product where a phenomenon of a failure or a problem occurred in the past, and input into the design support system 1 while the existence of occurrence of failure is indicated for each assembling operation or each attribute. In the design support system 1, the failure occurrence rate of each assembling operation is statistically calculated by the operating unit 30 with reference to that of an assembling operation (the assembling operation "downward move" of the housing 51 in the case of the assembling work shown in FIG. 2) executed initially with no attribute in the assembling work (for example, the failure occurrence rate of each assembling operation when the failure occurrence rate of the reference assembling operation is regarded as 1 is calculated). Based on the result of this calculation, a coefficient of each assembling operation, that is, each assembling operation coefficient is decided. In addition, the failure occurrence rate in the case where any specific attribute is involved in each assembling operation is statistically calculated. Based on the result of this calculation, a coefficient of each attribute, that is, each attribute coefficient is decided. Assembling operation coefficients and attribute coefficients decided thus are stored in the assembling operation/attribute coefficient database 41.

The input assembling operation analysis data 400 (FIG. 4) are stored in a not-shown memory of the design support system 1.

2. Creation of Assembling Component/Solution Database 42 [Steps S302 and S303]:

Solutions (e.g. countermeasures against failure) obtained for the assembling components in the aforementioned manner are created from respective assembling operation analysis data input through the input unit 10 (Step S302). These solutions are grouped and generalized into third, second and first levels, for example, through a KJ method or the like (Step S303). The generalized solutions are stored in the assembling component/solution database 42 so as to be associated with the corresponding assembling components.

As an example in which generalized solutions are created for an assembling operation as an assembling component, FIG. 5A shows a case example of grouped real data of the assembling operation "rotate" and generalized solutions obtained from the grouped real data. As an example in which generalized solutions are created for an attribute as an assembling component, FIG. 5B likewise shows a case example of grouped real data of the attribute "coupling portion difficult to observe" and generalized solutions obtained from the grouped real data.

As shown in FIG. 5A, in order to obtain generalized solutions of the assembling operation "rotate", combinations of problems in real data about rotation of parts such as a ventilating fan motor, a VTR guide pin, an electric machine changeover lever. etc. and solutions created to solve the problems are grouped in association with the assembling operation "rotate". In order to make the group of the solutions of the assembling operation "rotate" available in other technical fields, a generalized solution is created not to specify any technical field, that is, regardless of kinds of components etc. In the illustrated example, problems causing failure in assembling in the operation "rotate" in parts which are high in potential for failure in assembling are collected from real data, while solutions created for the problems respectively and one generalized solution to the assembling operation "rotate" obtained from the solutions are shown. A generalized solution is produced from solutions created for respective problems based on real data without specifying "ventilating fan motor positioning bracket", "VRT guide pin", "electric machine changeover lever", etc. in the intended technical fields. The solutions are grouped to be shared among various techniques in such a form as "widen bracket front end and attach it in linear motion", "narrow fitting portion front end and attach it in linear motion" or "extend fitting nail front end and attach it in linear motion" excluding those kinds of parts therefrom. Thus, a generalized solution "widen (narrow) fitting portion front end and attach it in linear motion" for the assembling operation "rotate" is produced from the grouped solutions.

When there is another group of solutions which can be grouped as to the assembling operation "rotate", another generalized solution can be obtained from that group. In this case, a plurality of generalized solutions are therefore provided for the assembling operation "rotate". The same thing can be applied to any other assembling operation.

As shown in FIG. 5B, in order to produce a generalized solution of the attribute "rotate", combinations of problems in real data about the attribute "coupling portion difficult to observe" of parts such as a ventilating fan motor, a VTR loading arm, an electric machine changeover lever. etc. and solutions created to solve the problems are grouped in association with the attribute "coupling portion difficult to observe". In order to make the group of the solutions of the attribute "coupling portion difficult to observe" available in other technical fields, a generalized solution is created not to specify any technical field, that is, regardless of kinds of parts etc. In the illustrated example, problems causing failure in assembling in parts which are high in potential for failure in assembling due to the "coupling portion difficult to observe" are collected from real data, while solutions created for the problems respectively and one generalized solution to the attribute "coupling portion difficult to observe" obtained from the solutions are shown. A generalized solution is produced from solutions created for respective problems based on real data without specifying "ventilating fan motor positioning bracket fixing screw", "VRT loading arm", "housing of electric machine changeover lever fitting nail", etc. in the intended technical fields. The solutions are grouped to be shared among various techniques in such a form as "relocate coupling portion in visible region" excluding those kinds of parts therefrom. Thus, a generalized solution "relocate coupling portion in visible region" for the attribute "coupling portion difficult to observe" is produced from the grouped solutions.

When there is another group of solutions which can be grouped as to the attribute "coupling portion difficult to observe", another generalized solution can be obtained from that group. In this case, a plurality of generalized solutions are therefore provided for the attribute "coupling portion difficult to observe". The same thing can be applied to any other attribute.

Generalized solutions obtained thus are stored as an assembling component/solution list 600 in the assembling component/solution database 42 so as to be associated with corresponding assembling components as shown in FIG. 6. In the example shown in FIG. 6, the assembling components are categorized into "part", "operation" and "attribute". The assembling component categorized into "part" includes "assembling parts". The assembling components categorized into "operation" include "shape" and "rotate. The assembling components categorized into "attribute" include "designed surface present" and "coupling portion difficult to observe". Not to say, there are other assembling components ("downward move", "press-in" and "three fitted simultaneously" in the example of FIG. 2), but they are omitted here. In the example shown in FIG. 6, each of the assembling components "assembling part", "rotate", "designed surface present" and "coupling portion difficult to observe" has two generalized solutions, while the assembling component "shape" has only one generalized solution.

In such a manner, "solutions" extracted for each assembling component defined in advance are collected by the operating unit 30 or the like based on a large number of past case examples of designing. The "solutions" are listed in association with the assembling component and stored in the assembling component/solution database 42 in the format of the assembling component/solution list 600 shown in FIG. 6.

3. Creation of Specific Solution Building Database 43:

The solutions stored in the assembling component/solution database 42 have been generalized by the algorism of the aforementioned Steps 302 and 303. It is often difficult to draw a specific image from such a generalized solution, and it is often difficult to determine whether the solution is good or not. Such generalized solutions are associated with risks in the solution/risk database 44 as will be described later, so that all the corresponding risks can be automatically acquired from the solutions. Since any solution has been generalized to be available in all the technical fields, it is difficult to draw a specific image. When an effective solution is selected from a plurality of solutions, it may be difficult to make the selection, as will be described later.

In order to make it easy to select such an effective solution, the specific solution building database 43 is provided to store data for giving shape to a generalized solution acquired from the assembling component/solution database 42, and for making the generalized solution understood easily in a specific technical field.

The data stored in the specific solution building database 43 include an algorism consisting of assembling components relating to generalized solutions, words and phrases required for producing specific solutions from the generalized solutions with the assembling components, procedures for producing the specific solutions from the assembling components and the words and phrases, etc. For example, when a generalized solution is produced and stored in the assembling component/solution database 42, corresponding assembling components are extracted from the assembling operation analysis data 400 (FIG. 4) corresponding to the produced generalized solution. The extracted assembling components and other words and phrases together with a procedure for producing a specific solution out of the extracted assembling components, the other words and phrases and the generalized solution are stored in the specific solution building database 43 in the form of an algorism.

For example, assume that the generalized solution "relocate coupling portion in visible region" as shown in the assembling component/solution list 600 in FIG. 6 is obtained for the assembling component (attribute) "coupling portion difficult to observe" of the assembling operation analysis data 400 as shown in FIG. 4. In this case, as assembling components associated with the generalized solution "relocate coupling portion in visible region", the part "changeover lever", the assembling operation "rotate" and the attribute "coupling portion difficult to observe" are extracted from the assembling operation analysis data 400. An algorism in which other words and phrases and a procedure are added to the extracted assembling components is stored in the specific solution building database 43.

For example, as a solution to the assembling component (attribute) "coupling portion difficult to observe" in FIG. 4, the generalized solution "relocate coupling portion in visible region" can be extracted from the assembling component/solution data 600 stored in the assembling component/solution database 42 as shown in FIG. 6. However, the expression of the extracted generalized solution is too general to be satisfied as a solution. The specific solution building database 43 serves to give specific expression to the generalized solution so as to make it understood easily. The words and phrases associated with the generalized solution "relocate coupling portion in visible region", that is, the part "changeover lever", the assembling operation "rotate", the attribute "coupling portion difficult to observe" and related words and phrases are read from the specific solution building database 43. A specific solution ""relocate coupling portion in visible region" to improve "coupling portion difficult to observe" during the operation "rotate" of the "changeover lever"" can be produced. Thus, a specific solution for specifying the generalized solution "relocate coupling portion in visible region" can be obtained.

4. Creating Solution/Risk Database 44 (Steps S304 and S305)

Based on real data used for creating each solution in Step S302, risks of the created solution, for example, risks to check the realizability of the solution is extracted (Step S304). The obtained risks are grouped and generalized into third, second and first levels, for example, through a KJ method or the like in the same manner as the aforementioned solutions are generalized (Step S305). The generalized risks are associated with their corresponding generalized solutions and stored in the solution/risk database 44.

That is, the assembling component/solution list 600 as shown in FIG. 6 is stored in the assembling component/solution database 42, while generalized risks expected to occur are associated with the generalized solutions in the assembling component/solution list 600 and stored as solution/risk data 700 shown in FIG. 7. Thus, generalized risks corresponding to generalized solutions can be acquired.

Such risks for various solutions are extracted and collected by the operating unit 30 or the like based on a large number of past case examples of designing.

5. Creation of Specific Risk Building Database 45:

As will be described later, risks are displayed together with their related solutions on the display 21 and evaluated. However, the risks stored in the solution/risk database 44 have been generalized. Therefore, users looking at the risks displayed often cannot have specific images. Also, it is difficult to evaluate the risks. The solution/risk database 44 stores generalized risks so that risks corresponding to a generalized solution can be acquired mechanically.

The specific risk building database 45 is provided to complement the solution/risk database 44. The specific risk building database 45 stores an algorism required for producing specific risks of assembling components associated with generalized risks or other words and phrases in the same manner as the specific solution building database 43.

Such an algorism is formed and stored in the following manner. For example, a produced generalized risk is stored in the solution/risk database 44. Based on a solution corresponding to the produced generalized risk, corresponding assembling operation analysis data 400 (FIG. 4) is traced. Assembling components (part, assembling operation or attribute) to be answered are extracted from the assembling operation analysis data 400. The extracted assembling components are associated with the generalized risks together with other words and phrases and a procedure for producing a specific risk. An algorism formed thus is stored in the specific risk building database 45.

For example, assume that the generalized risk "Can coupling portion be relocated in visible region?" as shown in the solution/risk list 700 in FIG. 7 is obtained for the solution "relocate coupling portion in visible region" of the assembling component (attribute) "coupling portion difficult to observe" of the assembling operation analysis data 400 as shown in FIG. 4. In this case, assembling components associated with the generalized risk "Can coupling portion be relocated in visible region?" include the part "changeover lever", the assembling operation "rotate" and the attribute "coupling portion difficult to observe". Further, related words and phrases required for specific expression for evaluating the risk "Can coupling portion be relocated in visible region?" are also added.

For example, as a risk expected when the solution "relocate coupling portion in visible region" to the assembling component (attribute) "coupling portion difficult to observe" in FIG. 4 is carried out, the risk "Can coupling portion be relocated in visible region?" can extracted from the solution/risk database 44 storing data such as the solution/risk list shown in FIG. 7. However, the expression of the extracted risk is too general to evaluate the risk. The specific risk building database 45 serves to give specific expression to the generalized risk so as to make it understood easily. The words and phrases associated with the generalized risk "Can coupling portion be relocated in visible region?", that is, the part "changeover lever", the assembling operation "rotate", the attribute "coupling portion difficult to observe" and other related words and phrases are read from the specific risk building database 45. A specific risk ""Can coupling portion be relocated in visible region?" when the solution "relocate coupling portion in visible region" to improve "coupling portion difficult to observe" during the operation "rotate" of the "changeover lever" is performed" can be produced. Thus, a specific risk for specifying the generalized risk "Can coupling portion be relocated in visible region?" can be obtained.

Another example will be shown. A generalized risk "Can fitting portion front end be shaped?" can be extracted from the solution "widen (narrow) fitting portion front end and attach it in linear motion" based on the solution/risk database 44. The assembling components associated with the generalized risk, that is, the part "changeover lever" and the assembling operation "rotate" are extracted from corresponding assembling operation analysis data 400 (FIG. 4), and stored in association with the generalized solution "widen (narrow) fitting portion front end and attach it in linear motion" together with other related words and phrases etc. A specific risk ""Can fitting portion front end be shaped?" when "widen (narrow) fitting portion front end and attach it in linear motion" to improve the operation "rotate" of the "changeover lever" is performed" is built in this case. Thus, the generalized risk "Can fitting portion front end be shaped?" can be specified.

In such a manner, the databases 41-45 are created to serve as a solution extraction algorithm, which is a solution extraction algorithm 46 for solving failures or problems occurring during designing products.

The databases 41-45 are created thus. To create the databases 41-45, it is, however, not always necessary to collect real data of case examples of designing in the design support system 1. Real data collected by another system may be acquired via a network and stored in the design support system 1.

Past results of designing products are collected and stored to build the databases 42 and 44 as described above. That is, "results of risks extracted from assembling components" and "results of risks extracted from solutions" can be arranged in the databases 42 and 44 respectively so as to be paired with each other.

Next, description will be made on the first embodiment of a design support method according to the present invention, in which the design support system 1 configured as described above performs improved designing with effective solutions and risks extracted along the solution extraction algorithm 46 in FIG. 3 (FIG. 1).

Figure 8:
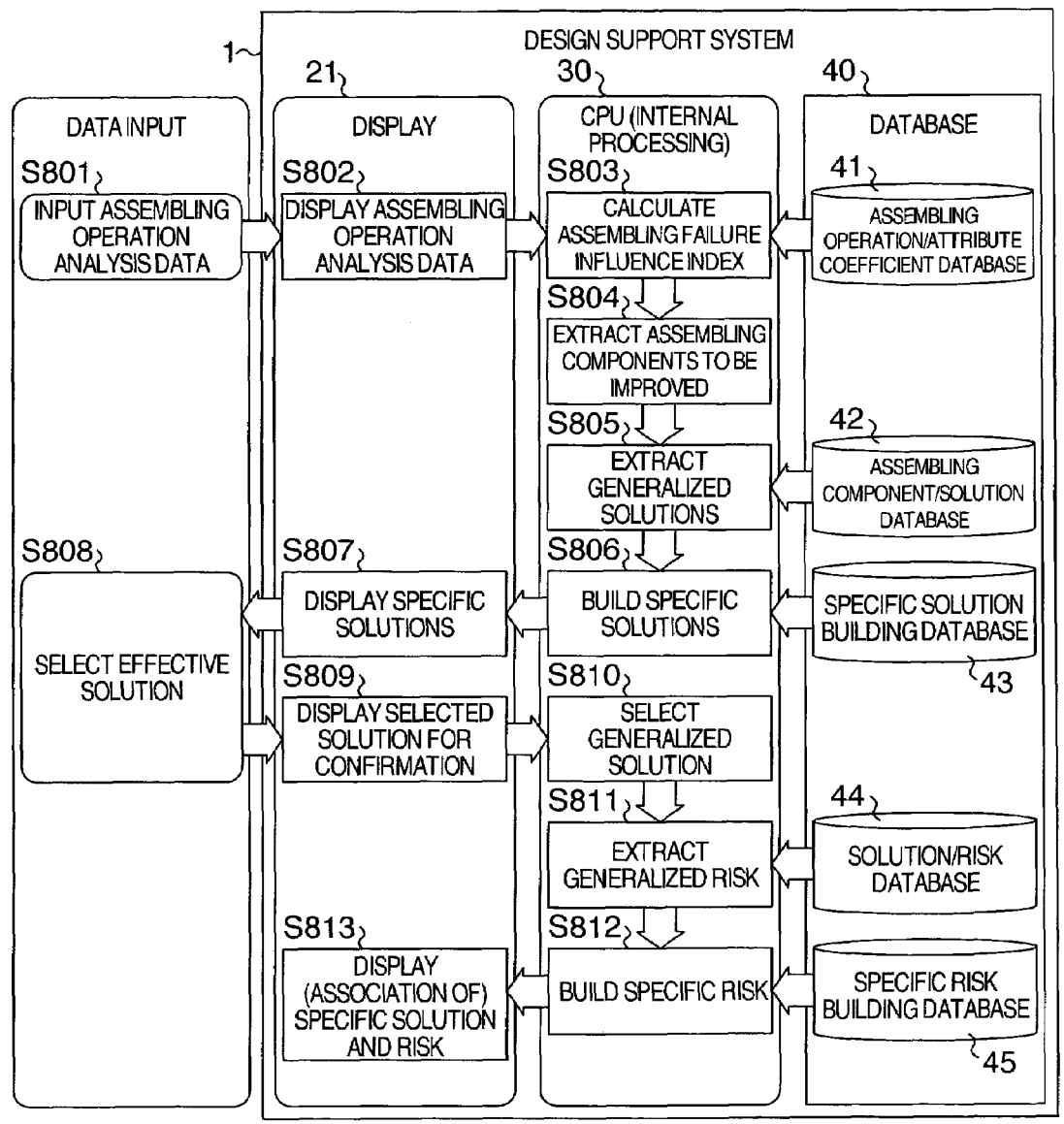
FIG. 8 is a flow chart showing a first embodiment of a design support method according to the invention for use in the design support system shown in FIG. 1.

FIG. 8 is a flow chart showing the first embodiment of the design support method according to the present invention. Assume that the assembling work shown in FIG. 2 and intended in product design is the subject in the case.

1. Input of Assembling Operation Analysis Data (Step S801) and Display Thereof (Step S802):

First, assembling operation analysis data are input to the design support system 1 through the input unit 10 (Step S801).

In this case, the assembling work shown in FIG. 2 is analyzed into target parts (the housing 51 and the changeover lever) to be subjected to this work, assembling operations (downward move, shape, rotate and press-in) to be performed upon the respective parts, and attributes (designed surface present, coupling portion difficult to observe, and three fitted simultaneously) involved in the assembling operations, in the same manner as the aforementioned creation of the assembling operation/attribute coefficient database 41. These parts, assembling operations and attributes are input by use of the input unit 10 and the display 21 so as to produce assembling operation analysis data 400 as shown in FIG. 4 (Step S801). The produced assembling operation analysis data 400 are displayed on the display 21 (Step S802).

2. Calculation of Assembling Failure Influence Index (Step S803):

In the design support system 1, an assembling failure influence index of each assembling component, that is, each part, each assembling operation and each attribute of the input assembling operation analysis data 400 is calculated by the operating portion 30. That is, an assembling operation coefficient and an attribute coefficient of each assembling component are extracted from the assembling operation/attribute coefficient database 41. The assembling failure influence index of each assembling component is calculated by proper operation using the assembling operation coefficient and the attribute coefficient (Step S803). A high assembling operation/attribute coefficient is assigned to an assembling component having high potential for failure in assembling. The assembling failure influence index of the assembling component having a high assembling operation/attribute coefficient is also high. Further, the assembling failure influence index of each assembling operation is also affected by the potential of its corresponding attribute for failure in assembling. On the contrary, the assembling failure influence index of each attribute is also affected by the potential of its corresponding assembling operation for failure in assembling.

FIG. 9 shows a specific example, In the specific example, the assembling failure influence indices of the housing and the changeover lever, the assembling failure influence index of the assembling operation "downward move" of the housing, the assembling failure influence indices of the assembling operations "downward move", "shape", "rotate" and "press-in" of the changeover lever, the assembling failure influence indices of the attribute "designed surface present" of the assembling operation "downward move" of the changeover lever, the attributes "designed surface present" and "coupling portion difficult to observe" of the assembling operation "rotate" of the same, and the attribute "three fitted simultaneously" of the assembling operation "press-in" of the same are calculated individually based on the assembling operation analysis data 400 shown in FIG. 4.

In the specific example shown in FIG. 9, the potential for failure in assembling is high in the assembling operations "shape", "rotate" and "press-in" of the changeover lever. Therefore, their assembling failure influence indices are high. Particularly the assembling failure influence index of the assembling operation "rotate" is provided with the attributes "designed surface present" and "coupling portion difficult to observe" high in potential for failure in assembling in addition to the high potential of the rotating operation itself for failure in assembling. Therefore, the assembling failure influence index of the assembling operation "rotate" is very high to be 57, as compared with the other assembling operations. The attributes "designed surface present" and "coupling portion difficult to observe" of the assembling operation "rotate" also have high assembling failure influence indices. Particularly, the assembling failure influence index of the attribute "coupling portion difficult to observe" of the assembling operation "rotate" is very high to be 46 as compared with the other attributes. This is not only because the attribute "coupling portion difficult to observe" itself has high potential for failure in assembling but also because the attribute is involved in the operation of rotation and because the operation of rotation includes the attribute "designed surface present" (the designed surface of the housing is affected when rotation is made in the state where the coupling portion is difficult to observe). The attribute "designed surface present" of the assembling operation "rotate" is lower in potential for failure in assembling than that not involved in the attribute "coupling portion difficult to observe" (that is, "designed surface present" is not affected by "coupling portion difficult to observe"). Thus, the assembling failure influence index of the attribute "designed surface present" is lower than that of the attribute "coupling portion difficult to observe".

Further, the changeover lever is high in potential for failure in assembling in the "rotate", "shape" and "press-in", and their assembling failure influence indices are high. The attributes "designed surface present" and "coupling portion difficult to observe" of the assembling operation "rotate" are high in potential for failure in assembling, and their assembling failure influence indices are high. As a result, the assembling failure influence index of the changeover lever is very high to be 99 while the assembling failure influence index of the housing is 1.

The assembling failure influence index of each assembling component here is expressed by the ratio on the assumption that the total rate of occurrence of failure of assembling operations and their attributes corresponding to the assembling operation/attribute coefficients in the assembling operation/attribute coefficient database 41 is 100. Such an assembling failure influence index may be replaced by the rate of occurrence of failure.

3. Extraction of Assembling Components to be Improved (Step S804):

Assembling components to be improved are extracted based on the assembling failure influence indices of the respective assembling components calculated in the aforementioned Step S803. To this end, as an example, a threshold value is set, and assembling components with assembling failure influence indices not lower than the threshold value are regarded as assembling components to be improved.

In the example shown in FIG. 9, for example, assume that the threshold value is set at "40", the following three assembling components having assembling failure influence indices not lower than the threshold value are extracted as assembling components to be improved.
(1) "changeover lever"
(2) assembling operation "rotate" of the changeover lever
(3) attribute "coupling portion difficult to observe" involved in the rotation operation of the changeover lever 4. Extraction of Generalized Solutions (Step S805):

As for the to-be-improved assembling components extracted in Step S804, corresponding generalized solutions are extracted from the assembling component/solution data 600 shown in FIG. 6, which are stored in the assembling component/solution database 42, as solutions to improve the to-be-improved assembling components. Based on FIG. 6, case examples of generalized solutions are extracted thus as:
(1) to-be-improved assembling component (part) "changeover lever"→solution: (i) to divide to-be-attached part and change order of assembling; or (ii) to integrate to-be-attached part with another part;
(2) to-be-improved assembling component (assembling operation) "rotate"→solution: (i) to widen (narrow) fitting portion forefront end and attach it in linear motion; or (ii) to attach it by screwing operation; and
(3) to-be-improved assembling component (attribute) "coupling portion difficult to observe"→solution: (i) to relocate coupling portion in visible region; or (ii) to relocate part component obstructive to coupling portion.

5. Building of Specific Solutions (Step S806):

Assembling components associated with the aforementioned generalized solutions are extracted from the specific solution building database 43. By use of the extracted assembling components, specific solutions are built from the generalized solutions complemented with words and phrases. The following specific solutions are built from the aforementioned generalized solutions respectively.
(1) (i) generalized solution "to divide to-be-attached part and change order of assembling"→extracted associated words and phrases "changeover lever"→specific solution ""to divide to-be-attached part and change order of assembling" to reduce assembling failure of "changeover lever"";
(ii) generalized solution "to integrate with another part"→extracted associated words and phrases "changeover lever"→specific solution ""to integrate with another part" to reduce assembling failure of "changeover lever"";
(2) (i) generalized solution "to widen (narrow) fitting portion forefront end and attach it in linear motion"→extracted associated words and phrases "changeover lever" and "rotate"→specific solution ""to widen (narrow) fitting portion forefront end and attach it in linear motion" to improve operation "rotate" of "changeover lever"";
(ii) generalized solution "to attach it by screwing operation"→extracted associated words and phrases "changeover lever" and "rotate"→specific solution ""to attach it by screwing operation" to improve operation "rotate" of "changeover lever""; and
(3) (i) generalized solution "to relocate coupling portion in visible region"→extracted associated words and phrases "changeover lever", "rotate" and "coupling portion difficult to observe"→specific solution ""to relocate coupling portion in visible region" to improve "coupling portion difficult to observe" during operation "rotate" of "changeover lever""; and
(ii) generalized solution "to relocate part component obstructive to coupling portion"→extracted associated words and phrases "changeover lever", "rotate" and "coupling portion difficult to observe"→specific solution ""to relocate part component obstructive to coupling portion" to improve "coupling portion difficult to observe" during operation "rotate" of "changeover lever"".

6. Display of Specific Solution List (Step S807):

The specific solutions produced thus are associated with their corresponding to-be-improved assembling components respectively so as to be displayed as a specific solution list 1000 on the display 21 as shown in FIG. 10. In the specific solution list 1000, the part names, the assembling operation names and the attribute names of the to-be-improved assembling components selected in Step S804 and the assembling failure influence indices calculated in Step S804 are displayed in to-be-improved assembling component display fields 1001, and all the specific solutions are displayed in specific solution display fields 1002 so as to be associated with the to-be-improved assembling components respectively. Result fields 1003 are provided for the specific solution display fields respectively.

7. Selection of Effective Solution (Step S808):

The specific solution list 1000 created thus includes effective specific solutions and unsuitable and ineffective specific solutions. An operator (designer or the like) operates the input unit 10 to select an effective specific solution for each to-be-improved assembling component while looking over the specific solution list 1000 displayed on the display 21. For example, the selected specific solution is instructed by clicking its corresponding result field 1003. Thus, the result field 1003 of the selected specific solution is displayed with a mark ⊚.

The specific solution list 1000 shown in FIG. 10 shows:
(1) to-be-improved assembling component (part) "changeover lever"→effective specific solution ""to divide to-be-attached part and change order of assembling" to reduce assembling failure of "changeover lever"";
(2) to-be-improved assembling component (assembling operation) "rotate"→effective specific solution ""to widen (narrow) fitting portion forefront end and attach it in linear motion" to improve operation "rotate" of "changeover lever""; and
(3) to-be-improve assembling component (attribute) "coupling portion difficult to observe"→effective specific solution ""to relocate coupling portion in visible region" to improve "coupling portion difficult to observe" during operation "rotate" of "changeover lever"".

8. Selection of Generalized Solution (Step S810):

When the selection of the effective solution has been confirmed in the aforementioned specific solution list 1000 (Step S809), the assembling components, words and phrases, etc. complemented in Step 806 are excluded from the specific solution selected as the effective solution. Thus, an original generalized solution is extracted.

9. Extraction of Generalized List (S811):

For each generalized solution extracted in Step S810, a generalized risk expected when the generalized solution is carried out is extracted from the solution/risk database 44 having a configuration shown in FIG. 7. The following gen eralized risks are extracted for the aforementioned generalized solutions respectively.

(1) generalized solution "to divide to-be-attached part and change order of assembling"→generalized risk "can to-be-attached part be divided?";
(2) generalized solution "to widen (narrow) fitting portion forefront end and attach it in linear motion"→"can fitting portion forefront end be shaped?"; and
(3) generalized solution "to relocate coupling portion in visible region"→"can coupling portion be relocated in visible region?".

10. Building of Specific Risks (Step S812):

For each generalized risk, associated assembling components and a generalized solution (associated words and phrases) are extracted from the specific risk building database 45. By use of the extracted assembling components and the extracted generalized solution, a specific risk is built from the generalized risk complemented with words and phrases. The following specific risks are built from the aforementioned generalized solutions respectively.

(1) generalized risk "can to-be-attached part be divided?"→extracted associated words and phrases "changeover lever" and "to divide to-be-attached part and change order of assembling"→specific risk ""can to-be-attached part be divided?" when "to divide to-be-attached part and change order of assembling" is carried out to improve assembling failure of "changeover lever"";
(2) generalized risk "can fitting portion forefront end be shaped?"→extracted associated words and phrases "changeover lever", "rotate" and "to widen (narrow) fitting portion forefront end and attach it in linear motion"→specific risk ""can fitting portion forefront end be shaped?" when "to widen (narrow) fitting portion forefront end and attach it in linear motion" is carried out to improve operation "rotate" of "changeover lever"; and
(3) generalized risk "can coupling portion be relocated in visible region?"→extracted associated words and phrases "changeover lever", "rotate", "coupling portion difficult to observe" and "to relocate coupling portion in visible region"→specific risk ""can coupling portion be relocated in visible region?" when "to relocate coupling portion in visible region" is carried out to improve "coupling portion difficult to observe" during operation "rotate" of "changeover lever".

11. Display of Specific Solutions and Specific Risks (Step S813):

The specific solutions (specific solutions marked with ⊚ in their result fields 1003 in FIG. 10) built in Step S806 and the specific risks built in the aforementioned Step S812 are associated with each other respectively so as to be displayed as a specific solution/risk list 1100 on the display 21 as shown in FIG. 11. In the specific solution/risk list 1100, the specific solutions are displayed in specific solution fields 1101 respectively, and the specific risks are displayed in specific risks fields 1103 respectively so as to be associated with the specific solutions respectively. Further, the assembling failure influence indices calculated in Step S803 and shown in FIG. 9 are also displayed correspondingly to the specific solutions. The specific solution/risk list 1100 can be also printed by the printing unit 22 of the output unit 20.

In the aforementioned manner, according to this embodiment, the assembling operation analysis data 400 shown in FIG. 4 are input through the input unit 10, and effective solutions are selected based on the assembling failure influence indices in the specific solution list 1000 shown in FIG. 10. Thus, as shown in FIG. 11, specific solutions corresponding to to-be-improved assembling components and risks expected when the solutions are carried out can be obtained automatically. As a result, specific design can be advanced efficiently.

"Solutions" for assembling components of a theme solved in the past may be extracted, and "risks" against the "solutions" may be extracted. Thus, those data are stored in a pair of databases 42 and 44 respectively in advance. In this manner, solutions and risks in a new theme can be obtained from many points of view.

FIG. 12 is a table showing another specific example of a specific solution/risk list displayed on the display 21 in Step S813 in FIG. 8.

In FIG. 12, in the specific solution/risk list 1200, specific solution fields 1201 are provided in the abscissa axis so that selected specific solutions are disposed in the specific solution fields 1201. Specific risk fields 1203 are provided in the ordinate axis so that selected specific risks are disposed in the specific risk fields 1203. Solution/risk association display portions 1204 are provided correspondingly to the specific solution fields 1201 and the specific risk fields 1203 respectively. Marks ⊚ are added to the solution/risk association display portions 1204 where the specific solutions and the specific risks are associated with each other. Here, the specific solutions and the specific risks used are similar to those in FIG. 11. Therefore, the association between the specific solutions and the specific risks is similar to that in FIG. 11. In the same manner as in FIG. 11, assembling failure influence index fields 1202 are also provided for the specific solutions respectively, and the assembling failure influence indices calculated in the aforementioned manner (Step S803 in FIG. 8) are displayed in the assembling failure influence index fields 1202 respectively.

The specific solution/risk list 1200 configured thus is displayed on the display 21 (Step S813 in FIG. 8). The designer can advance a specific design efficiently while looking over the specific solution/risk list 1200. In addition, the specific solution/risk list 1200 can be also printed by the printing unit 22 of the output unit 20.

In this manner, according to the first embodiment of the design support method, the association between solutions and risks is displayed specifically in a matrix. Thus, the method can be developed easily in another technique such as QFD or a KT method (registered trademark).

Figure 13:
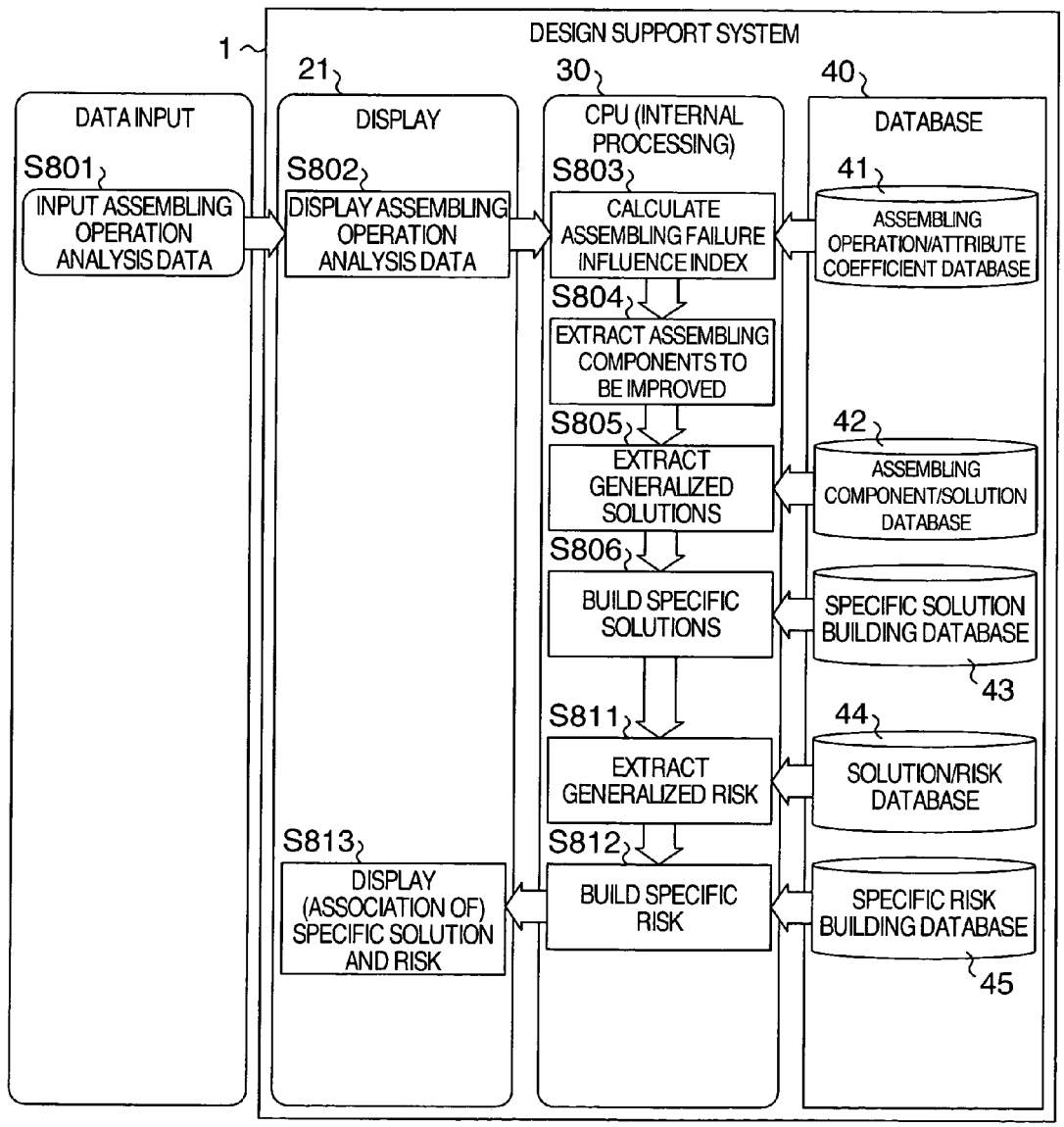
FIG. 13 is a flow chart showing a second embodiment of a design support method according to the invention for use in the design support system shown in FIG. 1.

FIG. 13 is a flow chart showing a second embodiment of a design support method for use in the design support system shown in FIG. 1.

In FIG. 13, Steps S807-S811 in the first embodiment of the design support method shown in FIG. 8 are omitted in the second embodiment of the design support method. In this case, in Step S813, specific risks are displayed for all the specific solutions built in Step S806. The designer may select an effective specific solution from all the specific solutions and evaluate risk about the selected effective specific solution.

Figure 14:
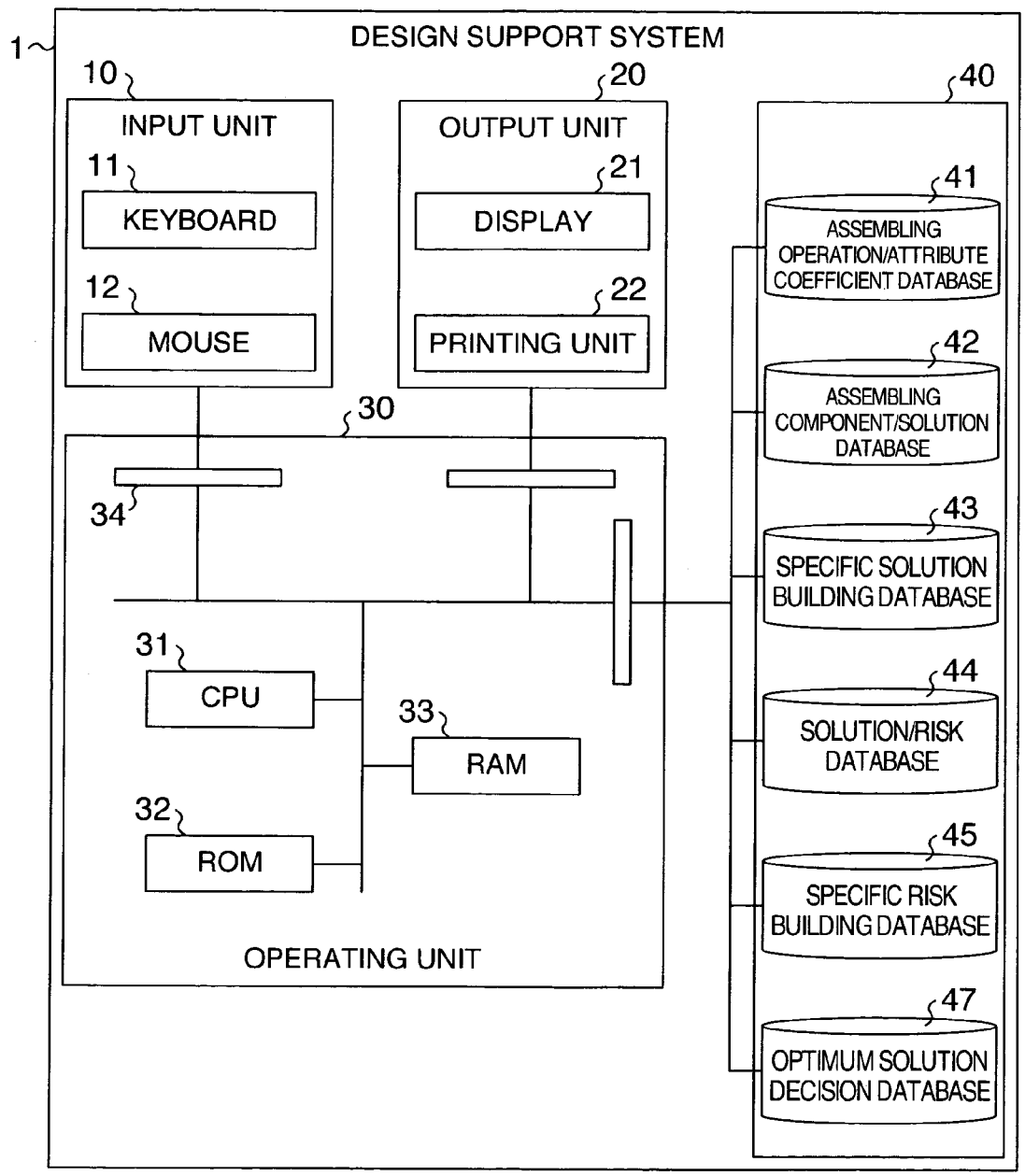
FIG. 14 is a configuration diagram showing a second embodiment of a design support system according to the invention.
Figure 15:
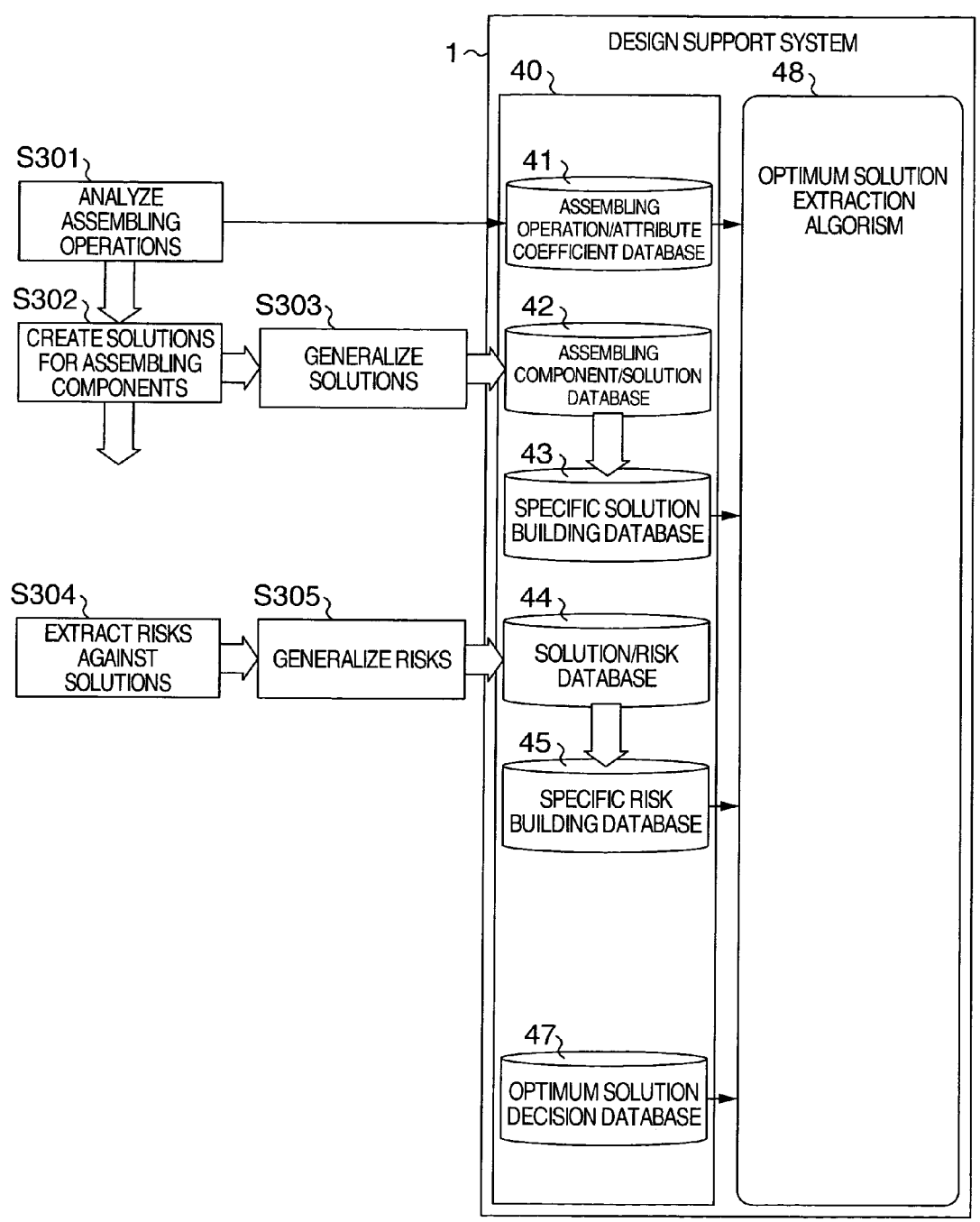
FIG. 15 is a flow chart showing a specific example of a method for creating databases in FIG. 14 using the case example of designing shown in FIG. 2 by way of example.

FIG. 14 is a configuration diagram showing the second embodiment of the design support system according to the present invention. FIG. 15 is a flow chart showing a specific example of a method for creating each database in FIG. 14. In FIG. 15, the case example of designing shown in FIG. 2 is used as an example. In FIG. 15, the reference numeral 47 represents an optimum solution decision database; and 48 represents an optimum solution extraction algorism. Parts corresponding to those in FIG. 1 or 3 are referenced correspondingly, and their redundant description will be omitted.

In FIG. 14, in the second embodiment, the optimum solution decision database 47 is added to the first embodiment shown in FIG. 1. The optimum solution decision database 47 stores functions for calculating various indices for deciding an optimum solution or a best solution.

As shown in FIG. 15, the assembling operation/attribute coefficient database 41, the assembling component/solution database 42, the specific solution building database 43, the solution/risk database 44 and the specific risk building database 45 are created in the methods previously described in FIG. 3. The optimum solution decision database 47 is created by storing the aforementioned functions. These databases 41-45 and 47 arrange an optimum solution extraction algorism 48.

Figure 16:
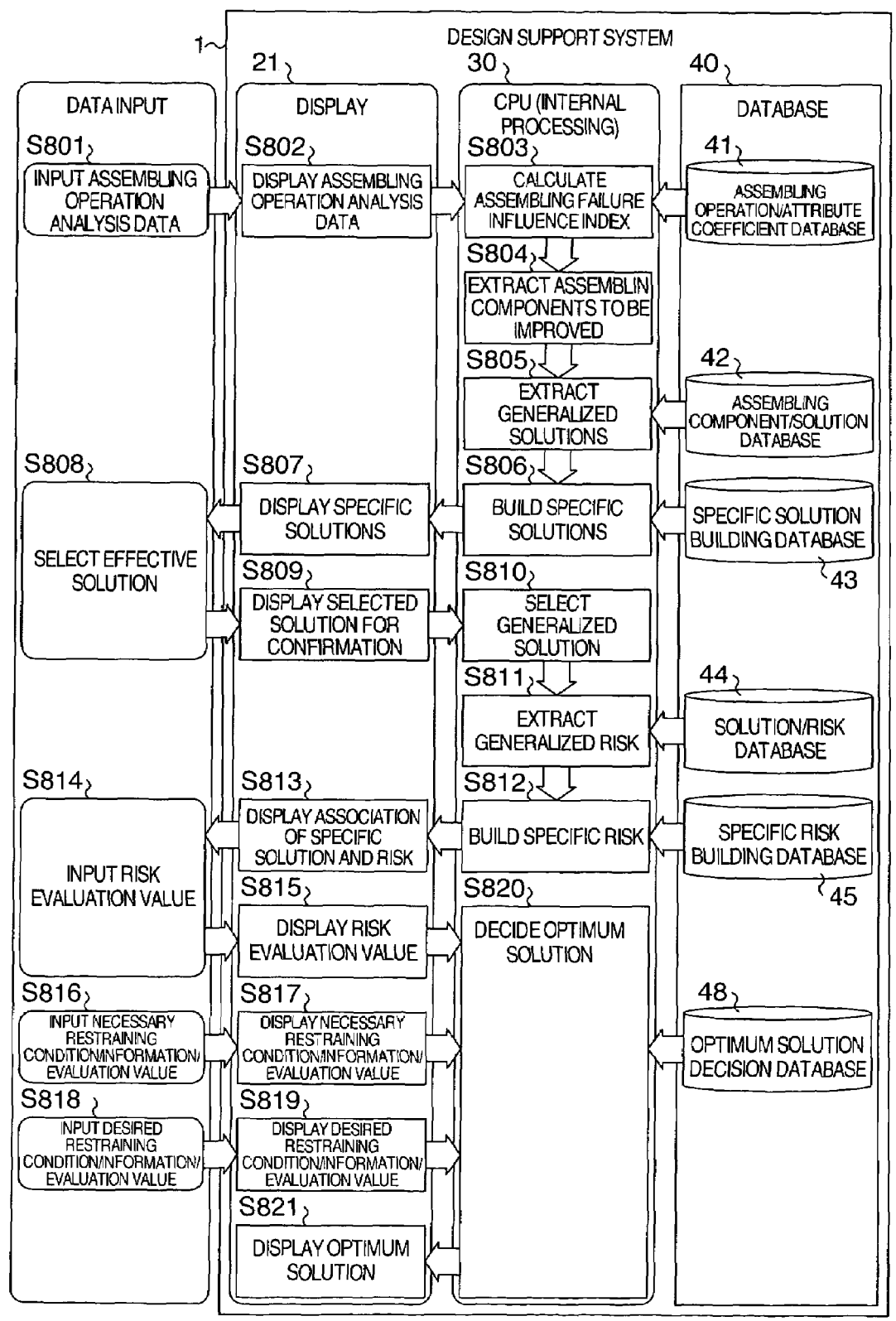
FIG. 16 is a flow chart showing a third embodiment of a design support method according to the invention for use in the design support system shown in FIG. 14.

FIG. 16 is a flow chart showing a third embodiment of a design support method according to the present invention carried out in accordance with the optimum solution extraction algorism shown in FIG. 15 using the case example of designing shown in FIG. 2 by way of example. Steps S801-S813 are similar to those of the flow chart shown in FIG. 8, so that their description will be omitted.

In the third embodiment, of the specific solutions obtained in Steps S801-S813 shown in FIG. 8 and displayed on the display 21, an optimum solution is decided or extracted (Step S814 or S821) by the optimum solution extraction algorism 48 using the optimum solution decision database 47 and based on evaluation of risks and restraining conditions. The restraining conditions for executing solutions are categorized into necessary restraining conditions which should be satisfied by the solutions and desired restraining conditions which the solutions are desired to satisfy.

In FIG. 16, specific risks are built (Step S812) and displayed on the display 21 (FIG. 14) so as to be associated with specific solutions built in Step S806, as described in FIG. 8. In this event, an optimum solution extraction screen 1700 shown in FIG. 17 is displayed.

The optimum solution extraction screen 1700 is constituted by a specific solution/risk list 1701 and an evaluation list 1702. In the specific solution/risk list 1701, risk evaluation input fields 1703 and risk index fields 1704 are added to the specific solution/risk list 1200 shown in FIG. 12, correspondingly to selected solutions respectively.

In the evaluation list 1702, restraining condition input fields (necessary restraining condition input fields 1705 and desired restraining condition input fields 1706), restraining condition index fields 1707 and total evaluation/total index fields 1708 are provided for selected specific solutions in the specific solution fields 1201 respectively. In the necessary condition input fields 1705, condition input fields 1705a, information input fields 1705b and evaluation input fields 1705c are provided for specific solutions respectively. The desired condition input fields 1706 are also provided with condition input fields 1706a, information input fields 1706b and evaluation input fields 1706c correspondingly to specific solutions respectively.

The risk evaluation input fields 1703, the necessary condition input fields 1705 and the desired condition input fields 1706 are input by the operator operating the input unit 10. Results obtained by computing data input into these input fields are displayed in the restraining condition index fields 1707 and the total evaluation/total index fields 1708 based on the optimum solution decision database 47.

Next, description will be made on data input (Step S814-S819) in FIG. 16. In the specific solution/risk list 1701 of the optimum solution extraction screen 1700 displayed in Step S813, data have not been input into any risk evaluation input field 1703 and any risk index field, while the same data as those in the specific solution/risk list 1200 shown in FIG. 12 are displayed in the other fields. In the evaluation list 1702 of the optimum solution extraction screen 1700, no data are displayed in any field.

1. Input of Risk Evaluation (Steps S814 and S815)

A risk evaluation $r_{ij}$ is input into each risk evaluation input field 1703 by the input unit 10. Here, the suffixes i and j designate the position of a solution/risk association display portion 1204 marked with ⊙. Here, a risk evaluation $r_{11}$ is input into the solution/risk association display portion 1204 corresponding to Solution 1 with Specific Risk No. 1 shown in FIG. 17; a risk evaluation $r_{22}$ is input into the solution/risk association display portion 1204 corresponding to Solution 2 with Specific Risk No. 2 shown in FIG. 17; and a risk evaluation $r_{33}$ is input into the solution/risk association display portion 1204 corresponding to Solution 3 with Specific Risk No. 3 shown in FIG. 17 (Step S814).

The risk evaluation $r_{ij}$ is a value corresponding to an expected value of the amount of a loss expected when the risk occurs actually. The larger the risk evaluation $r_{ij}$ is, the larger the amount of the loss is. In the illustrated example, the risk evaluation of Solution 1 with Specific Risk No. 1 is "80", which is the largest. The risk evaluation of Solution 2 with Specific Risk No. 2 is "30", which is the second largest. The risk evaluation of Solution 3 with Specific Risk No. 3 is "10", which is the smallest.

The risk evaluation $r_{ij}$ is expressed by the following Expression 1:

Expression 1

$$r_{ij}=p_{ij}\times s_{ij} \quad (1)$$

where $p_{ij}$ designates probability (scale of one to ten) of occurrence of a risk expected to occur when the solution is carried out; and $s_{ij}$ designates seriousness (scale of one to ten) when the risk occurs actually.

The operator may input the risk evaluation $r_{ij}$ calculated based on Expression 1. Alternatively, the operator may input both the probability $p_{ij}$ of occurrence of a risk and the seriousness $s_{ij}$ of the risk so that the risk evaluation $r_{ij}$ can be calculated by the operating unit 30.

Based on the risk evaluation $r_{ij}$ input thus, risk evaluations input into the risk evaluation input fields 1703 specified in the specific solution/risk list 1701 on the optimum solution decision screen 1700 are displayed as shown in FIG. 17 (Step S815).

2. Input of Necessary Restraining Conditions (Steps S816 and S817):

In this case, the input unit 10 is operated to input data into the condition input fields 1705a, the information input fields 1705b and the evaluation input fields 1705c of the necessary restraining condition fields 1705 (Step S816). A case example of data input to each field will be described below.

(2-1) Input to Condition Input Fields 1705a:

"Conditions" of the necessary restraining conditions to be input here designate conditions such as intended performance, improvement expense, time for completion, etc., which should be essentially by solutions. The conditions are input into the condition input fields 1705a of the necessary restraining condition fields 1705. Here, assume that two conditions "improvement expense" and "time for completion" are input.

(2-2) Input to Information Input Fields 1705b:

"Information" of the necessary restraining conditions to be input here designates information about the state of satisfaction of the necessary restraining conditions as a basis of evaluation of "conditions" input into the condition input fields 1705a. The information includes the specific amount of money for the condition "improvement expense" and the specific expiration date for the condition "time for completion". These pieces of "information" are input into Solutions 1, 2 and 3 listed on the specific solution/risk list 1701 individually.

(2-3) Input to Evaluation Input Fields 1705c:

The evaluation $m_{ij}$ is an evaluation indicating whether the "information" input to the corresponding information field 1705b satisfies the "condition" input to the corresponding condition input field 1705a or not. For example, the evaluation $m_{ij}$ is expressed by "o" when the "condition" is satisfied, and by "x" when the "condition" is not satisfied. In the illustrated example, in Solution 1, the "improvement expense" exceeds the "condition", and the evaluation of the condition "improvement expense" is regarded as "x". In any other solution, the "condition" is satisfied, and the evaluation thereof is therefore regarded as "o".

When the "conditions", "information" and "evaluations" of the necessary restraining conditions are input thus, data input into the condition input fields 1705a, the information input fields 1705b and the evaluation input fields 1705c are displayed as shown in FIG. 17 (Step S817).

3. Input of Desired Restraining Conditions (Steps S818 and S819):

In this case, the input unit 10 is operated to input data into the condition input fields 1706a, the information input fields 1706b and the evaluation input fields 1706c of the desired restraining condition fields 1706 (Step S818). A case example of data input to each field will be described below.

(3-1) Input to Condition Input Fields 1706a:

"Conditions" of the desired restraining conditions to be input here designate restraining conditions desired to be satisfied by selected Solutions 1, 2 and 3 respectively. The "conditions" are input into the condition input fields 1706a of the desired restraining condition fields 1706. Here, assume that two conditions "to use conventional techniques if possible" and "to be able to be developed to similar goods" are input.

(3-2) Input to Information Input Fields 1706b:

"Information" of the desired restraining conditions to be input here designates information about the state of satisfaction of the desired restraining conditions as a basis of evaluation of "conditions" input into the condition input fields 1706a. The "information" is input into Solutions 1, 2 and 3 listed on the risk list 1701 individually. Here, for example, assume that "mold newly developed" is input for the aforementioned condition "to use conventional techniques if possible", and "no developed technique" is input to Solution 1 for the condition "to be able to be developed to similar goods" while "to be able to be developed" is input to Solutions 2 and 3 likewise.

(3-3) Input to Evaluation Input Fields 1706c:

The evaluation $W_{ij}$ is a value corresponding to an expected value of technical or economical profit when the "information" input to the corresponding information field 1706b satisfies the "condition" input to the corresponding condition input field 1706a. The evaluation $W_{ij}$ is expressed by the following Expression 2:

Expression 2

$$W_{ij} = i_{ij} \times f_{ij} \quad (2)$$

where $i_{ij}$ designates seriousness (scale of one to ten) of a desired restraining condition; and $f_{ij}$ designates degree of satisfaction (scale of one to ten) of the desired restraining condition for each solution.

In FIG. 17, assume that evaluations $W_{ij}$ shown in FIG. 17 are input into the evaluation input fields 1706c for "condition" and "information" of each solution.

When the "conditions", "information" and "evaluations" of the desired restraining conditions are input thus, data input into the condition input fields 1706a, the information input fields 1706b and the evaluation input fields 1706c are displayed as shown in FIG. 17 (Step S819).

Data are input to the necessary restraining condition fields 1705 and the desired restraining condition fields 1706 in the aforementioned manner. Next, the operating unit 30 uses necessary functions of the optimum solution decision database 47 so as to calculate risk indices to be displayed in the risk index fields 1704, calculate restraining condition indices to be displayed in the restraining condition index fields 1707, and calculate total indices to be displayed in the total evaluation/total index fields 1708. Total evaluation is performed based on those results (Step S820). The result of the total evaluation is displayed on the display 21 (Step S821). This point will be described below.

(1) Calculation of Risk Index $R_i$:

Each risk index $R_i$ is an index of its corresponding solution, which index is a value corresponding to an expected value of the amount of a loss expected when the solution is carried out. The risk index $R_i$ is expressed by the following Expression 3 using the aforementioned risk evaluation $r_{ij}$ in the corresponding risk evaluation input field 1703. That is:

$$R_i = \sum_j r_{ij} \times 100 \Big/ \max\Big(\sum_j r_{ij}\Big) \quad (3)$$

The risk index $R_i$ is calculated thus for each Solution 1, 2, 3, and the result of the calculation is displayed in the risk index field 1704 of the Solution 1, 2, 3 in the evaluation list 1701 in FIG. 17. In the example shown in FIG. 17, the total sum $\Sigma r_{1j}$ of the risk evaluations $r_{1j}$ is 80 in the risk evaluation input field 1703 of Solution 1, the total sum $\Sigma r_{2j}$ of the risk evaluations $r_{2j}$ is 30 in the risk evaluation input field 1703 of Solution 2, and the total sum $\Sigma r_{3j}$ of the risk evaluations $r_{3j}$ is 10 in the risk evaluation input field 1703 of Solution 3. Therefore, the total sum $\Sigma r_{1j}$ of the risk evaluations $r_{1j}$ in the risk evaluation input field 1703 of Solution 1 is the largest max $(\Sigma r_{ij})$. Accordingly, as shown in the risk index fields 1704 in FIG. 17, the risk indices are expressed by:

Solution 1 risk index $R_1 = 80 \times 100/80 = 100$

Solution 2 risk index $R_2 = 30 \times 100/80 = 38$

Solution 3 risk index $R_3 = 10 \times 100/80 = 13$ (2) Calculation of Restraining Condition Index $MW_i$:

First, it is examined whether all the necessary conditions for each Solution 1, 2, 3 are satisfied or not. In the example shown in FIG. 17, the evaluation $m_{ij}$ in the evaluation input field 1705c for the condition "improvement expense" of Solution 1 is "x". Therefore, the restraining condition index $MW_i$ thereof is set at "x".

Next, for each Solution 2, 3 all the necessary conditions of which are satisfied (that is, the evaluation value $m_{ij}$ is "o", the value corresponding to the expected value of technical or economical profit expected when Solution 2, 3 is carried out is formed into an index so as to obtain its restraining condition index $MW_i$. This restraining condition index $MW_i$ is obtained from the evaluations $W_{ij}$ in the evaluation fields 1706c of the desired restraining condition field 1706, that is, expressed by the following Expression 4:

$$MW_i = \sum_j W_{ij} \times 100 \bigg/ \max\left(\sum_j W_{ij}\right) \quad (4)$$

Thus, the restraining condition index $MW_i$ is calculated for each Solution 2, 3, and the result of the calculation is displayed in the restraining condition index field 1707 of the Solution 2, 3 in the evaluation list 1702 in FIG. 17. In the example shown in FIG. 17, the total sum $\Sigma W_{2j}$ of the evaluations $W_{2j}$ is 62 in the evaluation field 1706c of the desired restraining condition field 1706 of Solution 2, and the total sum $\Sigma W_{3j}$ of the evaluations $W_{3j}$ is 94 in the evaluation field 1706c of the desired restraining condition field 1706 of Solution 3. Therefore, the total sum $\Sigma W_{3j}$ of the evaluations $W_{3j}$ in the desired restraining condition field 1706c of Solution 3 is the largest $\max(\Sigma W_{ij})$. Accordingly, as shown in the restraining condition index fields 1707 in FIG. 17, the restraining condition indices are expressed by:

Solution 2 restraining condition index $MW_2=62\times100/94=66$

Solution 3 restraining condition $MW_3=94\times100/94=100$ (3) Calculation of Total Index $T_i$:

For each selected Solution 1, 2, 3, a profit/loss expected when the solution is carried out is obtained as the following index based on the calculation results of the risk index $R_i$ and the restraining condition index $MW_i$, so as to be formed as a total index $T_i$.

(a) Set the total index $T_i=x$ when the restraining condition index $MW_i$ is "x".

(b) It might be considered that the difference between the profit expected by satisfaction of the desired restraining condition and the loss expected by the risk, that is, the difference (restraining condition index $MW_i$–risk index $R_i$) is set as the total index $T_i$. However, there occurs a problem that there is a difference in restraining condition index $MW_i$ and risk index $R_i$ in spite of the same total index $T_i$ as follows.

$$MW_i=100, R_i=50\rightarrow T_i=MW_i-R_i=50 \quad (i)$$

$$MW_i=50, R_i=0\rightarrow T_i=MW_i-R_i=50 \quad (ii)$$

In fact, the merit increases as the restraining condition index $MW_i$ increases, while the demerit increases as the risk index $R_i$ increases. Therefore, a value obtained by integrating the weighted total sum of the restraining condition index $MW_i$ and the risk index $R_i$ with the difference between the restraining condition index $MW_i$ and the risk index $R_i$ is used as the difference between the profit and the loss.

(c) Each total index $T_i$ is corrected so that the maximum value thereof is 100.

From above, each total index $T_i$ is expressed by the following Expression 5. That is, Expression 5

$$T_i=(MW_i^2-R_i^2)\times100/\max(MW_i^2-R_i^2) \quad (5)$$

Thus, the total index $T_i$ for each Solution 1, 2, 3 is calculated, and the result of the calculation is displayed in the corresponding total index field 1708b of the total evaluation/total index field 1708 in the evaluation list 1702 in FIG. 17. In the example shown in FIG. 17, "x" is displayed in the total index field 1708b of Solution 1. The total indices $T_i$ are "55" and "100" in the total index fields 1708b of Solutions 2 and 3 respectively, based on the arithmetic operation of the aforementioned Expression 5 using the restraining condition index $MW_i$ in the restraining condition index field 1707 and the risk index $R_i$ in the risk index field 1704.

(4) Total Evaluation

Total evaluation is decided in the following manner in each total evaluation display field 1708a of the total evaluation/total index field 1708. Thus, an optimum solution can be decided.

(i) A solution whose total index $T_i$ is not smaller than 90 is, for example, regarded as "optimum solution", and this is displayed.

(ii) A solution whose total index $T_i$ is not smaller than 50 and smaller than 90 is, for example, regarded as "good solution", and this is displayed.

(iii) A solution whose total index $T_i$ is not smaller than 0 and smaller than 50 is, for example, regarded as "good solution", and this is displayed.

(iv) A solution whose total index $T_i$ is negative is, for example, regarded as "high risk", and this is displayed.

(v) A solution whose total index $T_i$ is "x" is, for example, regarded as "necessary condition unsatisfied", and this is displayed.

The optimum solution decision screen 17 made up thus is displayed on the display 21 (Step S821). The optimum solution decision screen 17 can be also printed by the printing unit 22 of the output unit 20.

As has been described above, according to the embodiment of the invention, the design support system 1 having various databases is used, and the assembling operation analysis data 400 (FIG. 4) of a product to be designed are input. Thus, solutions and their risks can be extracted based on the solution decision algorism 46 and the optimum solution decision algorism 48. Further, an optimum solution can be decided easily by evaluation of the risks and input and evaluation of restraining conditions.

The aforementioned description was made about the embodiments. The invention is not limited to the description, but it is obvious for those skilled in the art that various changes and modifications can be made on the invention without departing from the spirit of the invention and the scope of the accompanying claims.

The invention claimed is:

1. A design support method for extracting solutions for solving a failure or problem phenomenon when the failure or problem phenomenon occurs in a new case example of designing, comprising:

a storing step of storing assembling operation/attribute coefficients as a database in advance, the assembling operation/attribute coefficients indicating potentials for failure in assembling of assembling operations and attributes respectively, the assembling operation/attribute coefficients being decided based on a large number of past case examples of designing where there occurred failure or problem phenomena;

a computing step of calculating failure influence indices based on the assembling operation/attribute coefficients read from the database when there occurs a failure or problem phenomenon in a new case example of designing, the failure influence indices indicating influences of parts, assembling operations of each part, and attributes involved in each assembling operation on a failure in assembling; and an extraction/presentation step of displaying and presenting the failure influence indices on a screen so that ones of the parts, the assembling operations and the attributes can be extracted based on the failure influence indices, the failure influence indices having been calculated for the parts, the assembling operations and the attributes respectively in the new case example of designing.

2. A design support method for extracting solutions for solving a failure or problem phenomenon when the failure or problem phenomenon occurs in a new case example of designing, comprising:

a storing step of storing assembling operation/attribute coefficients and data as a database in advance, the assembling operation/attribute coefficients indicating potentials for failure in assembling of assembling operations and attributes respectively, the assembling operation/attribute coefficients being decided based on a large number of past case examples of designing where there occurred failure or problem phenomena, the data including assembling operations, attributes and solutions for the assembling operations and attributes, the assembling operations, the attributes and the solutions being collected, associated with one another, hierarchized and developed;

an input step of inputting parts in a new case example of designing, assembling operations of the parts, and attributes involved in the assembling operations when there occurs a failure or problem phenomenon in the new case example of designing;

a computing step of calculating failure influence indices based on the assembling operation/attribute coefficients read from the database, the failure influence indices indicating influences of the input parts of the new case example of designing, the input assembling operations of each part, and the input attributes involved in each assembling operation on a failure in assembling;

a selection step of selecting ones high in the calculated failure influence indices from the input parts of the new case example of designing, the input assembling operations and the input attributes;

an extraction step of extracting solutions associated with the selected parts, assembling operations or attributes from the database;

a building step of building specific solutions from the extracted solutions and the parts, assembling operations or attributes associated with the solutions; and a presentation step of displaying and presenting at least the built specific solutions on a screen.

3. A design support method for extracting solutions for solving a failure or problem phenomenon when the failure or problem phenomenon occurs in a new case example of designing, comprising:

a storing step of storing assembling operation/attribute coefficients and data as a database in advance, the assembling operation/attribute coefficients indicating potentials for failure in assembling of assembling operations and attributes respectively, the assembling operation/attribute coefficients being decided based on a large number of past case examples of designing where there occurred failure or problem phenomena, the data including assembling operations, attributes, solutions for the assembling operations and attributes, and risks against the solutions, the assembling operations, the attributes, the solutions and the risks being collected, associated with one another, hierarchized and developed;

an input step of inputting parts in a new case example of designing, assembling operations of the parts, and attributes involved in the assembling operations when there occurs a failure or problem phenomenon in the new case example of designing;

a computing step of calculating failure influence indices based on the assembling operation/attribute coefficients read from the database, the failure influence indices indicating influences of the input parts of the new case example of designing, the input assembling operations of each part, and the input attributes involved in each assembling operation on a failure in assembling;

a selection step of selecting ones high in the calculated failure influence indices from the input parts of the new case example of designing, the input assembling operations and the input attributes;

an extraction step of extracting solutions associated with the selected parts, assembling operations or attributes, and risks associated with the solutions from the database;

a solution building step of building specific solutions from the extracted solutions and the parts, assembling operations or attributes associated with the solutions;

a risk building step of building specific risks from the extracted risks and the parts, assembling operations or attributes associated with the risks; and a presentation step of displaying and presenting at least the built specific solutions and the built specific risks on a screen.

4. A design support method according to claim 3, further comprising the steps of:

inputting evaluation values of the specific risks in accordance with the specific solutions; and calculating risk indices using the input evaluation values;

wherein the risk indices are displayed and presented on the screen together with the specific solutions and the specific risks in the presentation step.

5. A design support method according to claim 3, further comprising the steps of:

inputting evaluation values of restraining conditions with which the specific solutions will be carried out, in accordance with the specific solutions; and calculating restraining condition indices using the evaluation values of the restraining conditions;

wherein the restraining condition indices are displayed and presented on the screen together with the specific solutions and the specific risks in the presentation step.

6. A design support method according to claim 3, further comprising the steps of:

inputting evaluation values of restraining conditions with which the specific solutions will be carried out respectively, and evaluation values of the specific risks against the specific solutions, in accordance with the specific solutions; and calculating total indices or final evaluation values using the evaluation values of the restraining conditions and the evaluation values of the specific risks;

wherein the total indices or the final evaluation values are displayed and presented on the screen together with the specific solutions and the specific risks in the presentation step.

7. A design support system for extracting solutions for solving a failure or problem phenomenon when the failure or problem phenomenon occurs in a new case example of designing, comprising:

a database for storing assembling operation/attribute coefficients, the assembling operation/attribute coefficients indicating potentials for failure in assembling of assembling operations and attributes respectively, the assembling operation/attribute coefficients being decided based on a large number of past case examples of designing where there occurred failure or problem phenomena;

a computing means for calculating failure influence indices based on the assembling operation/attribute coefficients read from the database when there occurs a failure or problem phenomenon in a new case example of designing, the failure influence indices indicating influences of parts, assembling operations of each part, and attributes involved in each assembling operation in the new example of designing on a failure in assembling; and a presentation means for displaying and presenting the failure influence indices on a screen, the failure influence indices having been calculated for the parts, the assembling operations and the attributes respectively in the new case example of designing.

8. A design support system for extracting solutions for solving a failure or problem phenomenon when the failure or problem phenomenon occurs in a new case example of designing, comprising:

a database for storing assembling operation/attribute coefficients and data, the assembling operation/attribute coefficients indicating potentials for failure in assembling of assembling operations and attributes respectively, the assembling operation/attribute coefficients being decided based on a large number of past case examples of designing where there occurred failure or problem phenomena, the data including assembling operations, attributes and solutions for the assembling operations and attributes, the assembling operations, the attributes and the solutions being collected, associated with one another, hierarchized and developed;

an input means for inputting parts in a new case example of designing, assembling operations of the parts, and attributes involved in the assembling operations when there occurs a failure or problem phenomenon in the new case example of designing;

a computing means for calculating failure influence indices based on the assembling operation/attribute coefficients read from the database, the failure influence indices indicating influences of the input parts of the new case example of designing, the input assembling operations of each part, and the input attributes involved in each assembling operation on a failure in assembling;

a selection means for selecting ones high in the calculated failure influence indices from the input parts of the new case example of designing, the input assembling operations and the input attributes;

an extraction means for extracting solutions associated with the selected parts, assembling operations or attributes from the database;

a building means for building specific solutions from the extracted solutions and the parts, assembling operations or attributes associated with the solutions; and a presentation means for displaying and presenting at least the built specific solutions on a screen.

9. A design support system for extracting solutions for solving a failure or problem phenomenon when the failure or problem phenomenon occurs in a new case example of designing, comprising:

a database for storing assembling operation/attribute coefficients and data, the assembling operation/attribute coefficients indicating potentials for failure in assembling of assembling operations and attributes respectively, the assembling operation/attribute coefficients being decided based on a large number of past case examples of designing where there occurred failure or problem phenomena, the data including assembling operations, attributes, solutions for the assembling operations and attributes, and risks against the solutions, the assembling operations, the attributes, the solutions and the risks being collected, associated with one another, hierarchized and developed;

an input means for inputting parts in a new case example of designing, assembling operations of the parts, and attributes involved in the assembling operations when there occurs a failure or problem phenomenon in the new case example of designing;

a computing means for calculating failure influence indices based on the assembling operation/attribute coefficients read from the database, the failure influence indices indicating influences of the input parts of the new case example of designing, the input assembling operations of each part, and the input attributes involved in each assembling operation on a failure in assembling;

a selection means for selecting ones high in the calculated failure influence indices from the input parts of the new case example of designing, the input assembling operations and the input attributes;

an extraction means for extracting solutions associated with the selected parts, assembling operations or attributes, and risks associated with the solutions from the database;

a solution building means for building specific solutions from the extracted solutions and the parts, assembling operations or attributes associated with the solutions;

a risk building means for building specific risks from the extracted risks and the parts, assembling operations or attributes associated with the risks; and a presentation means for displaying and presenting at least the built specific solutions and the built specific risks on a screen.

10. A design support system according to claim 9, further comprising:

a means for inputting evaluation values of the specific risks in accordance with the specific solutions; and a means for calculating risk indices using the input evaluation values;

wherein the risk indices are displayed and presented on the screen together with the specific solutions and the specific risks by the presentation means.

11. A design support system according to claim 9, further comprising:

a means for inputting evaluation values of restraining conditions with which the specific solutions will be carried out, in accordance with the specific solutions; and a means for calculating restraining condition indices using the evaluation values of the restraining conditions;

wherein the restraining condition indices are displayed and presented on the screen together with the specific solutions and the specific risks by the presentation means.

12. A design support system according to claim 9, further comprising:

a means for inputting evaluation values of restraining conditions with which the specific solutions will be carried out, and evaluation values of the specific risks against the specific solutions, in accordance with the specific solutions; and a means for calculating total indices or final evaluation values using the evaluation values of the restraining conditions and the evaluation values of the specific risks;

wherein the total indices or the final evaluation values are displayed and presented on the screen together with the specific solutions and the specific risks by the presentation means.

* * * * *